United States Patent
Tokuchi

(10) Patent No.: US 11,100,674 B2
(45) Date of Patent: Aug. 24, 2021

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 64 days.

(21) Appl. No.: 16/051,810

(22) Filed: Aug. 1, 2018

(65) Prior Publication Data

US 2019/0228542 A1 Jul. 25, 2019

(30) Foreign Application Priority Data

Jan. 23, 2018 (JP) .............................. JP2018-009006

(51) Int. Cl.
| | | |
|---|---|---|
| *G06T 7/73* | (2017.01) | |
| *G06T 3/60* | (2006.01) | |
| *G06T 3/20* | (2006.01) | |
| *G06T 3/40* | (2006.01) | |
| *G02B 30/56* | (2020.01) | |
| *H04N 5/247* | (2006.01) | |
| *G06T 7/593* | (2017.01) | |
| *G02B 27/14* | (2006.01) | |

(52) U.S. Cl.
CPC .............. *G06T 7/74* (2017.01); *G02B 30/56* (2020.01); *G06T 3/20* (2013.01); *G06T 3/40* (2013.01); *G06T 3/60* (2013.01); *G06T 7/593* (2017.01); *G02B 27/144* (2013.01); *G06T 2207/10012* (2013.01); *H04N 5/247* (2013.01)

(58) Field of Classification Search
None
See application file for complete search history.

(56) References Cited

U.S. PATENT DOCUMENTS

| | | | |
|---|---|---|---|
| 9,778,738 B2 | 10/2017 | Sugimoto et al. | |
| 2015/0077573 A1* | 3/2015 | Ishikawa | G06T 3/005 348/189 |
| 2016/0353068 A1* | 12/2016 | Ishikawa | H04N 9/3147 |

(Continued)

FOREIGN PATENT DOCUMENTS

| | | |
|---|---|---|
| JP | 2013-109421 A | 6/2013 |
| JP | 2014-157482 A | 8/2014 |

(Continued)

OTHER PUBLICATIONS

Hong, Suk-Pyo, Yong-Seok Oh, and Eun-Soo Kim. "Practical implementation of a depth-feeling-enhanced two-plane electro-floating display system using three-dimensional integral images." Journal of the Society for Information Display 17.5 (2009): 423-431. (Year: 2009).*

(Continued)

*Primary Examiner* — Vu Le
*Assistant Examiner* — Tracy Mangialaschi
(74) *Attorney, Agent, or Firm* — Oliff PLC

(57) ABSTRACT

An information processing apparatus includes a detection unit that detects overlapping between a first image and a second image. The first image and the second image are formed in the air.

14 Claims, 37 Drawing Sheets

(56) References Cited

U.S. PATENT DOCUMENTS

2017/0227929 A1* 8/2017 Suginohara ............ G02B 30/40
2019/0235737 A1* 8/2019 Kuribayashi ........ G03H 1/0406

FOREIGN PATENT DOCUMENTS

JP        2017-062709 A     3/2017
WO    WO-2018003860 A1 *  1/2018  ............. G09G 5/391

OTHER PUBLICATIONS

Yamamoto, Hirotsugu, et al. "Design of crossed-mirror array to form floating 3D LED signs." Stereoscopic displays and applications XXIII. vol. 8288. International Society for Optics and Photonics, 2012. (Year: 2012).*

Yoshida, Shunsuke. "fVisiOn: 360-degree viewable glasses-free tabletop 3D display composed of conical screen and modular projector arrays." Optics express 24.12 (2016): 13194-13203. (Year: 2016).*

Miyazaki, Daisuke, and Satoshi Maekawa. "Aerial imaging display based on a heterogeneous imaging system consisting of roof mirror arrays." 2014 IEEE 3rd Global Conference on Consumer Electronics (GCCE). IEEE, 2014. (Year: 2014).*

* cited by examiner

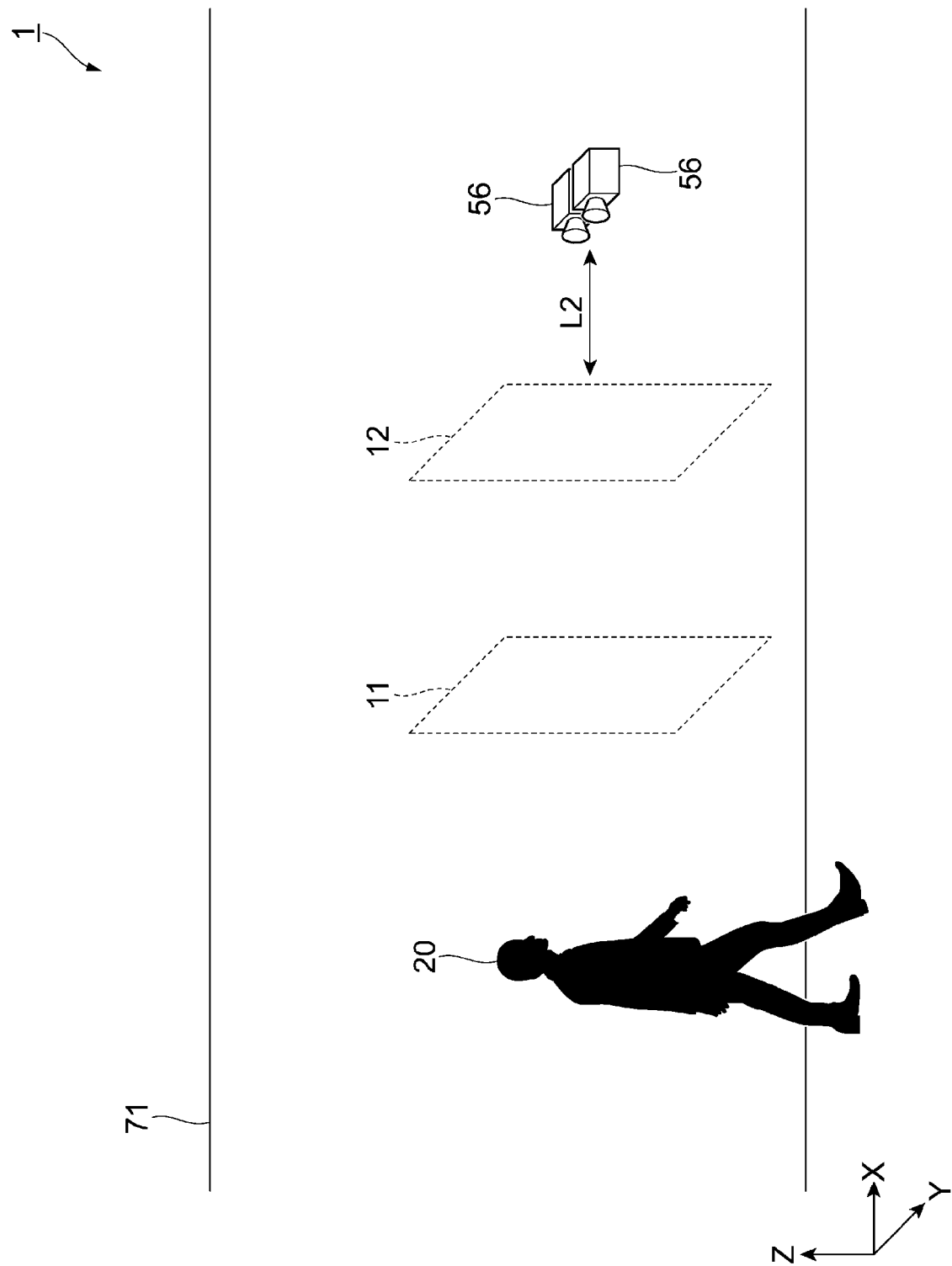

FIG. 17A
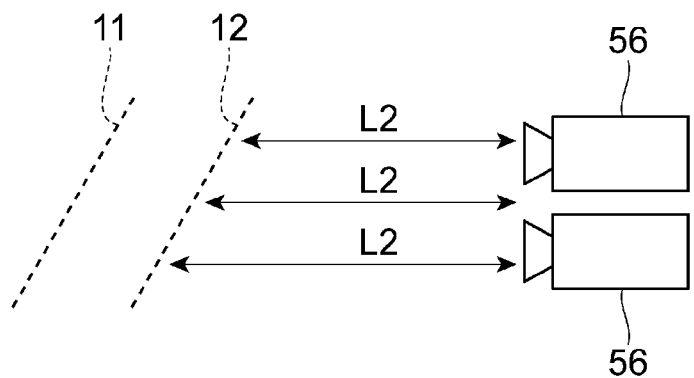
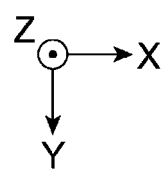
FIG. 17B
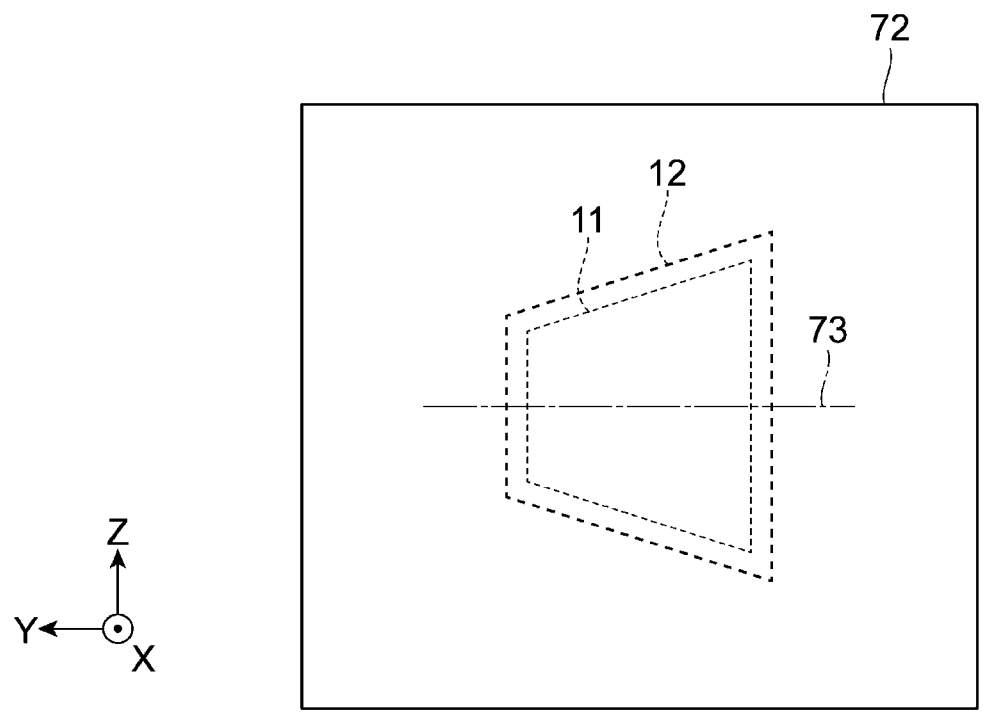

FIG. 18A
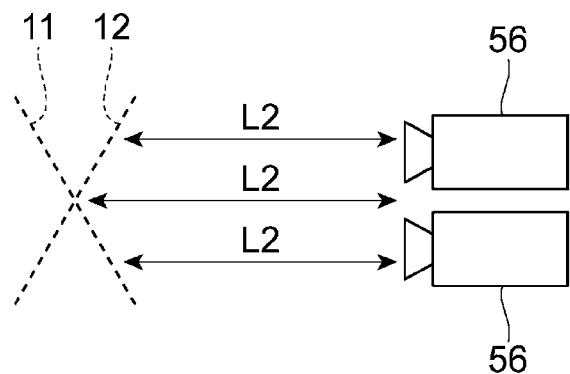
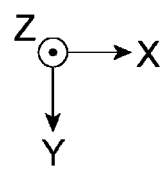
FIG. 18B
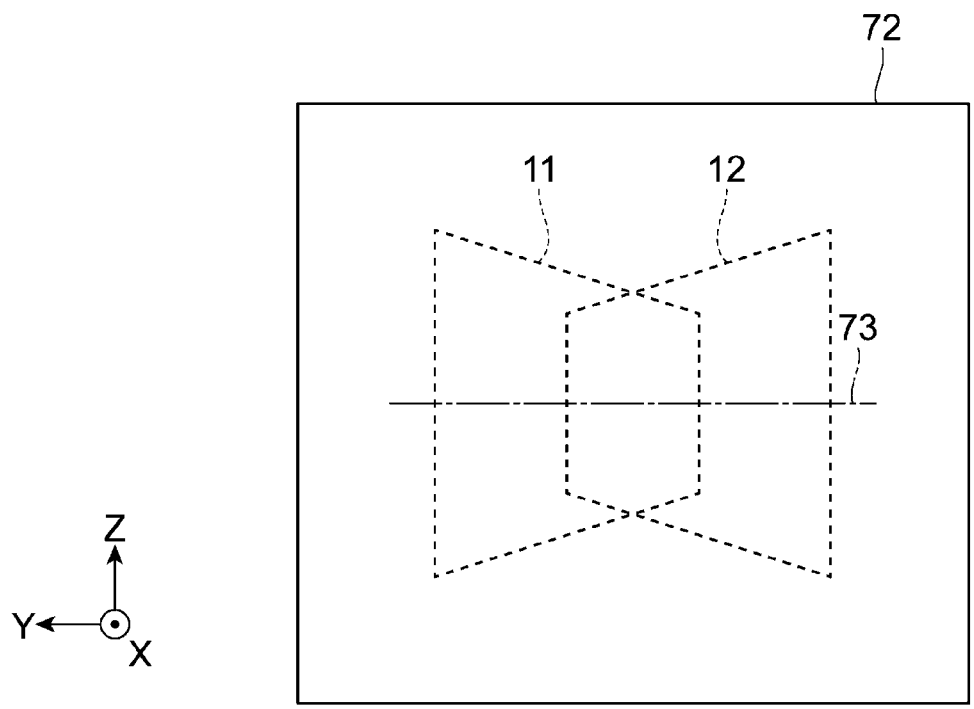

FIG. 23A
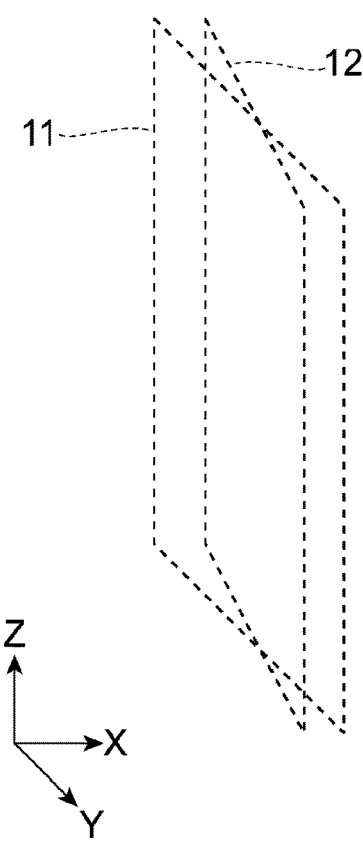
FIG. 23B
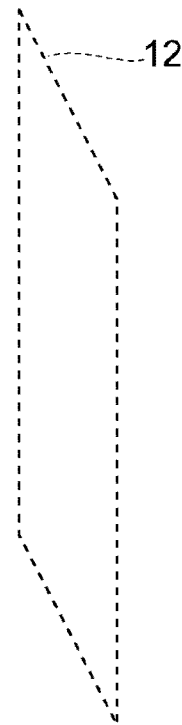
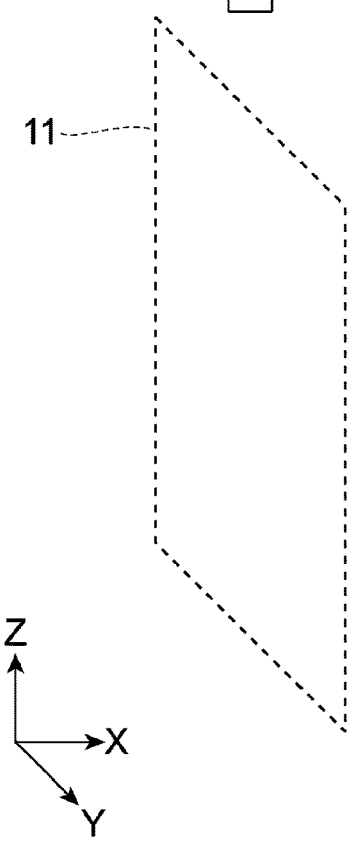

FIG. 29A
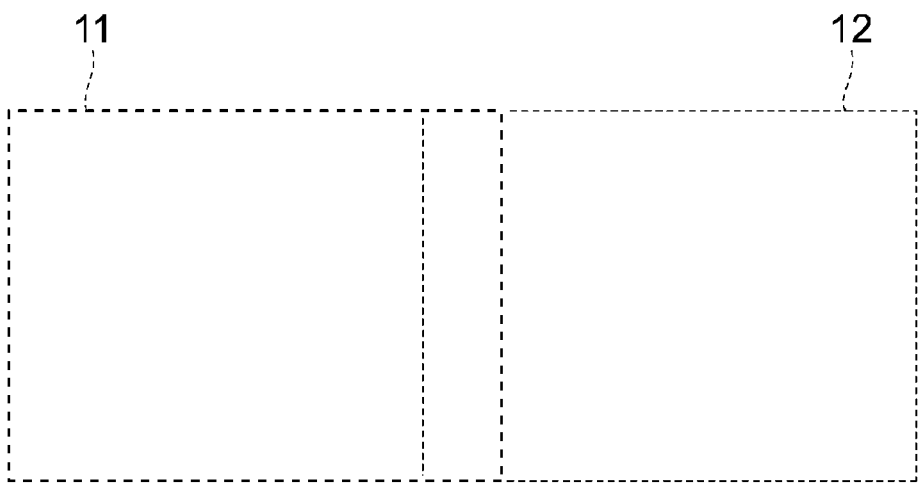
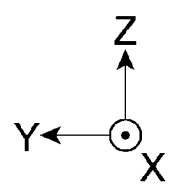
FIG. 29B
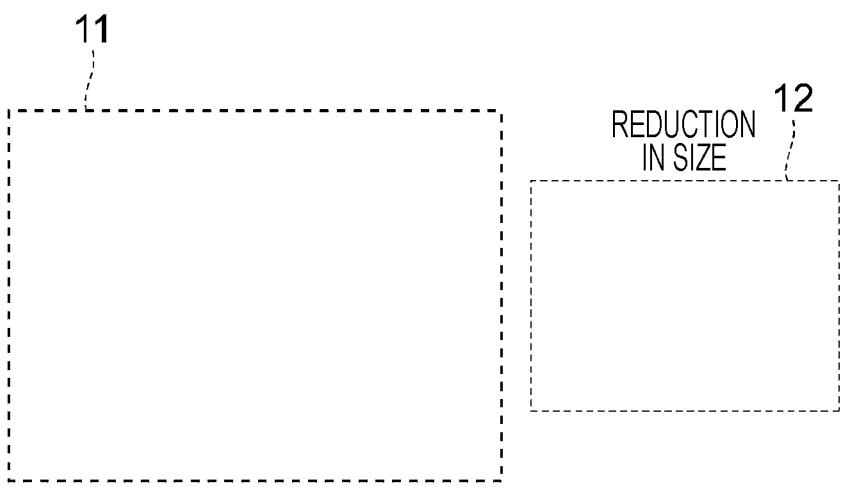
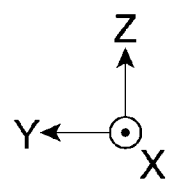

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-009006 filed Jan. 23, 2018.

BACKGROUND

(i) Technical Field

The present invention relates to an information processing apparatus, an information processing system, and a non-transitory computer readable medium.

(ii) Related Art

A technique is known in which beams are made to cross each other in the air so that an image is formed at the intersection point of the beams. An image displayed by using this type of technique is also called an aerial image.

SUMMARY

According to an aspect of the invention, there is provided an information processing apparatus including a detection unit that detects overlapping between a first image and a second image. The first image and the second image are formed in the air.

BRIEF DESCRIPTION OF THE DRAWINGS

Exemplary embodiments of the present invention will be described in detail based on the following figures, wherein:

FIG. 16 is a diagram illustrating the positional relationship between overlapping detection sensors and aerial images;

FIG. 17A is a diagram illustrating an exemplary positional relationship obtained when aerial images do not overlap each other;

FIG. 17B is a diagram illustrating an exemplary image captured in the case of FIG. 17A;

FIG. 18A is a diagram illustrating an exemplary positional relationship obtained when aerial images overlap each other;

FIG. 18B is a diagram illustrating an exemplary image captured in the case of FIG. 18A;

FIG. 23A is a diagram illustrating another exemplary method of resolving a crossing of aerial images, and illustrating the initial state;

FIG. 23B is a diagram illustrating an example in which the crossing in FIG. 23A is resolved through translation;

FIG. 29A is a diagram illustrating an exemplary method of resolving a crossing of aerial images, and illustrating the initial state;

FIG. 29B is a diagram illustrating an example in which the crossing in FIG. 29A is resolved through reduction in size;

DETAILED DESCRIPTION

Figure 1:
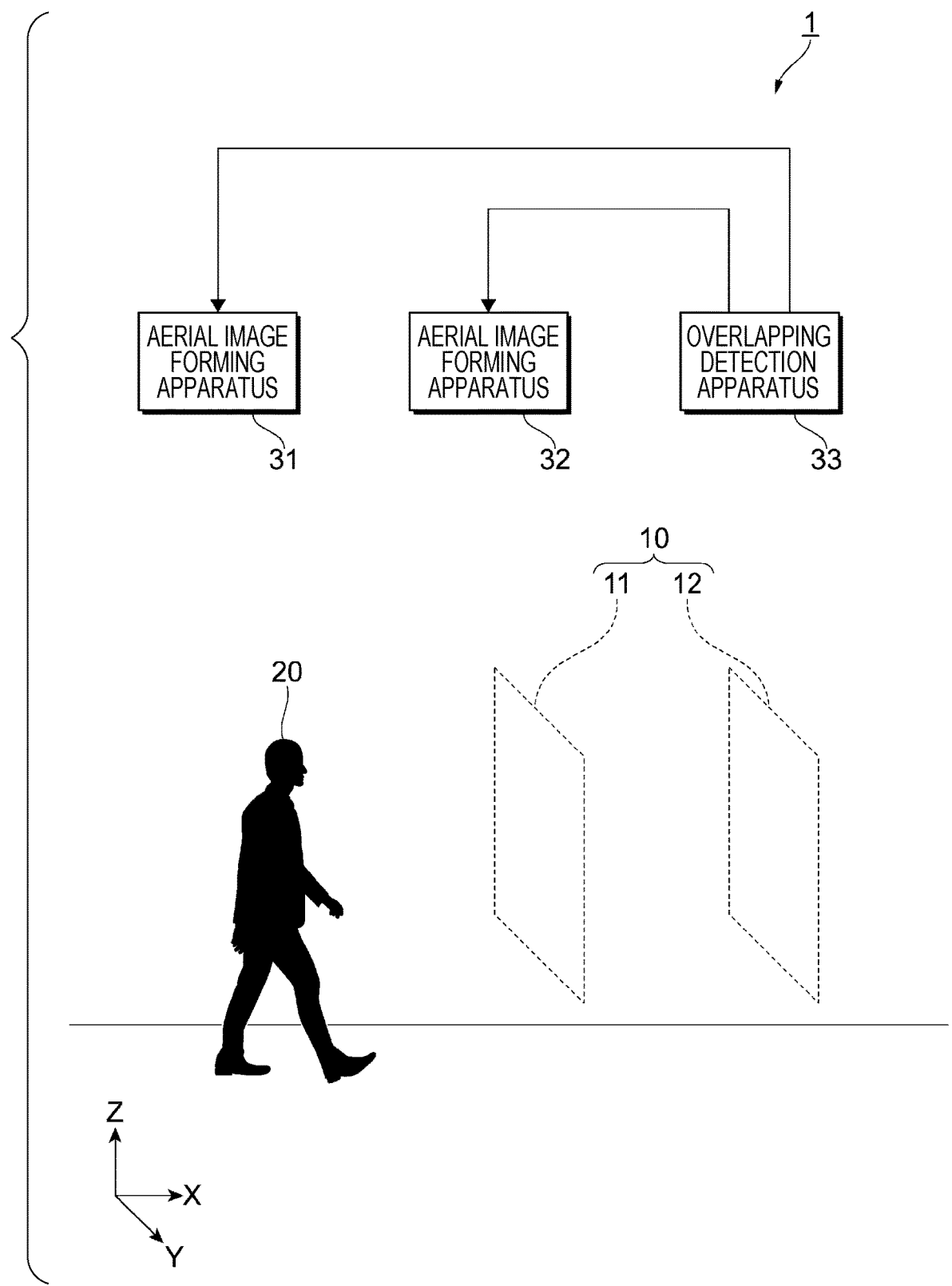
FIG. 1 is a diagram illustrating a schematic configuration of an aerial image forming system according to a first exemplary embodiment.

Referring to the drawings, exemplary embodiments of the present invention will be described below.

First Embodiment

Schematic Configuration of an Aerial Display

FIG. 1 is a diagram illustrating a schematic configuration of an aerial image forming system 1 according to a first exemplary embodiment.

In the first exemplary embodiment, an aerial image 10 is an image formed in the air so that the state of light equivalent to light reflected from an object is reproduced. The aerial image 10 is formed as if floating in the air. Therefore, a person may go through the aerial image 10.

In the first exemplary embodiment, the case in which two aerial images 10 are formed in a single space is assumed.

In the first exemplary embodiment, one of the images is an aerial image 11, and the other is an aerial image 12. The aerial image 11 is an exemplary first image, and the aerial image 12 is an exemplary second image.

The aerial image forming system 1 according to the first exemplary embodiment includes an aerial image forming apparatus 31, an aerial image forming apparatus 32, and an overlapping detection apparatus 33. The aerial image forming apparatus 31 forms the aerial image 11 in the air. The aerial image forming apparatus 32 forms the aerial image 12 in the air. The overlapping detection apparatus 33 detects overlapping between the aerial images 11 and 12 in a space.

The aerial image forming system 1 is an exemplary information processing system. The overlapping detection apparatus 33 is an exemplary information processing apparatus. The aerial image forming apparatuses 31 and 32 are exemplary image forming units. The aerial image forming apparatus 31 is an exemplary first image forming unit, and the aerial image forming apparatus 32 is an exemplary second image forming unit.

FIG. 1 illustrates the state in which the aerial images 11 and 12 are formed in parallel along a path.

In the first exemplary embodiment, guide screens and/or advertisement screens are displayed on the aerial images 11 and 12. Operation screens on which the display is changed in accordance with operations performed by a person 20 may be displayed on the aerial images 11 and 12. However, the displayed screen is not limited to a guide screen, an advertisement screen, or an operation screen.

On the aerial images 11 and 12, a still image may be displayed, or a moving image may be displayed.

In the exemplary embodiments, the entire rectangle is regarded as an aerial image 10. However, the shape defining the fringe of an aerial image 10 is not limited to a rectangle, and may be any shape. For example, a space in which an image of an object is formed may be regarded as the entire space in which an aerial image 10 is formed. For example, an operation button image, a person image, an animal image, a product image, and a fruit image may be examples of an aerial image 10. In FIG. 1, an aerial image 10 has a planar shape. However, an aerial image 10 may have a three dimensional shape, such as a curved surface, a ball, or a cube.

The overlapping detection apparatus 33 detects overlapping between the aerial images 11 and 12 in a space. When overlapping is detected, control for transmitting a notification and reducing overlapping is performed.

In the first exemplary embodiment, overlapping indicates the state in which the aerial images 11 and 12 are viewed as if information on the aerial image 11 is displayed on information on the aerial image 12. For example, overlapping occurs due to crossing, in a space, of at least portions of the aerial images 11 and 12. The case in which crossing of the aerial images 11 and 12 in a space is detected as overlapping will be described below.

The overlapping detection apparatus 33 may be installed in advance on the ceiling, the wall, or the floor of a space in which the aerial images 11 and 12 are to be formed, or may be carried, for inspection, into a space in which the aerial images 11 and 12 are to be formed.

Exemplary Aerial Image Forming Apparatus

By using FIGS. 2A to 6, the principles of forming the aerial images 11 and 12 will be described. The principles described below are known.

In the first exemplary embodiment, the configuration of the aerial image forming apparatus 31 which forms the aerial image 11 is common to the configuration of the aerial image forming apparatus 32. Therefore, in FIGS. 2A to 6, the configuration of the aerial image forming apparatus 31 is illustrated.

The principle used by the aerial image forming apparatus 31 may be different from the principle used by the aerial image forming apparatus 32.

Figure 2A:
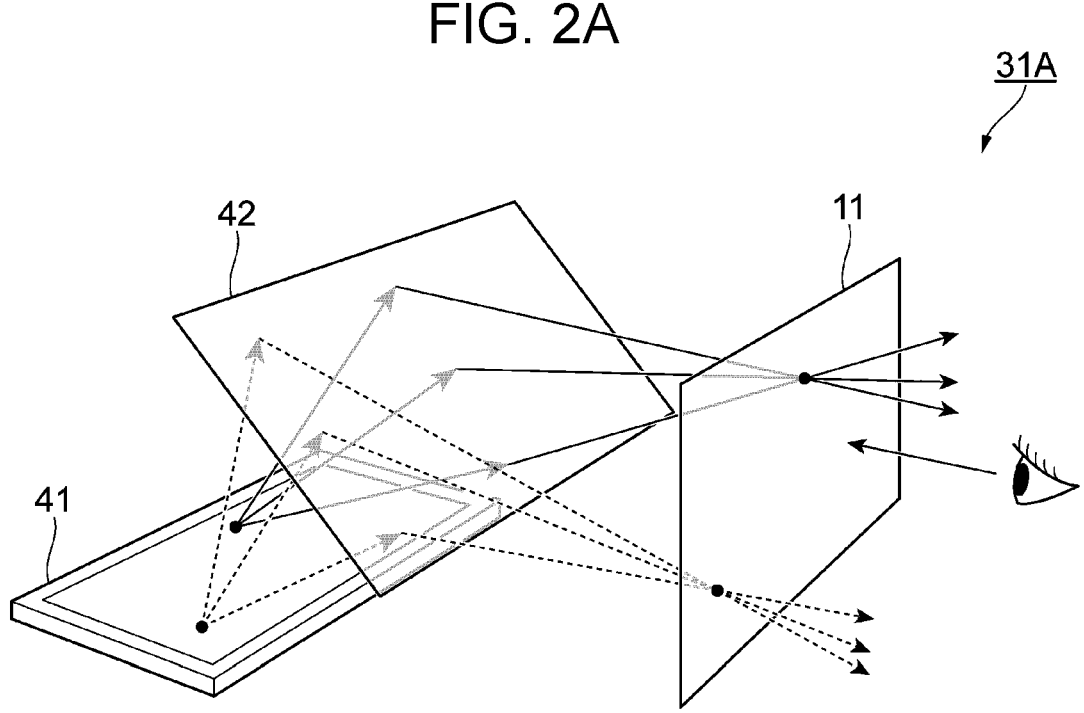
FIG. 2A is a diagram illustrating the principle of an aerial image forming apparatus that forms an aerial image by transmitting, through a dedicated optical plate, light that is output from a display device, and illustrating the positional relationship between each component and the aerial image.
Figure 2B:
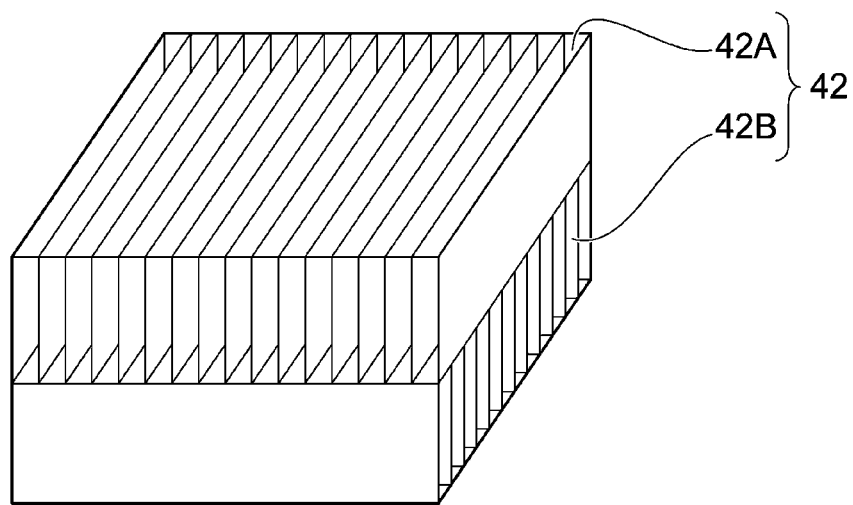
FIG. 2B is a diagram illustrating a portion of the cross section structure of the optical plate in FIG. 2A.

FIGS. 2A and 2B are diagrams illustrating the principle of an aerial image forming apparatus 31A that forms the aerial image 11 by transmitting, through a dedicated optical plate 42, light that is output from a display device 41. FIG. 2A illustrates the positional relationship between each component and the aerial image 11. FIG. 2B illustrates a portion of the cross section structure of the optical plate 42. The display device 41 and the optical plate 42 are exemplary optical components.

The optical plate 42 has a structure in which a first plate is stacked on top of a second plate. In the first plate, strip glass 42A whose wall surface is used as a mirror is arranged. In the second plate, strip glass 42B is arranged in the direction orthogonal to the glass 42A.

The optical plate 42 causes light, which is output from the display device 41, to be reflected twice, for formation of an image, on the strip glass 42A and the strip glass 42B. Thus, an image displayed on the display device 41 is reproduced in the air. The distance between the display device 41 and the optical plate 42 is the same as the distance between the optical plate 42 and the aerial image 11. The size of an image displayed on the display device 41 is the same as the size of the aerial image 11.

Figure 3:
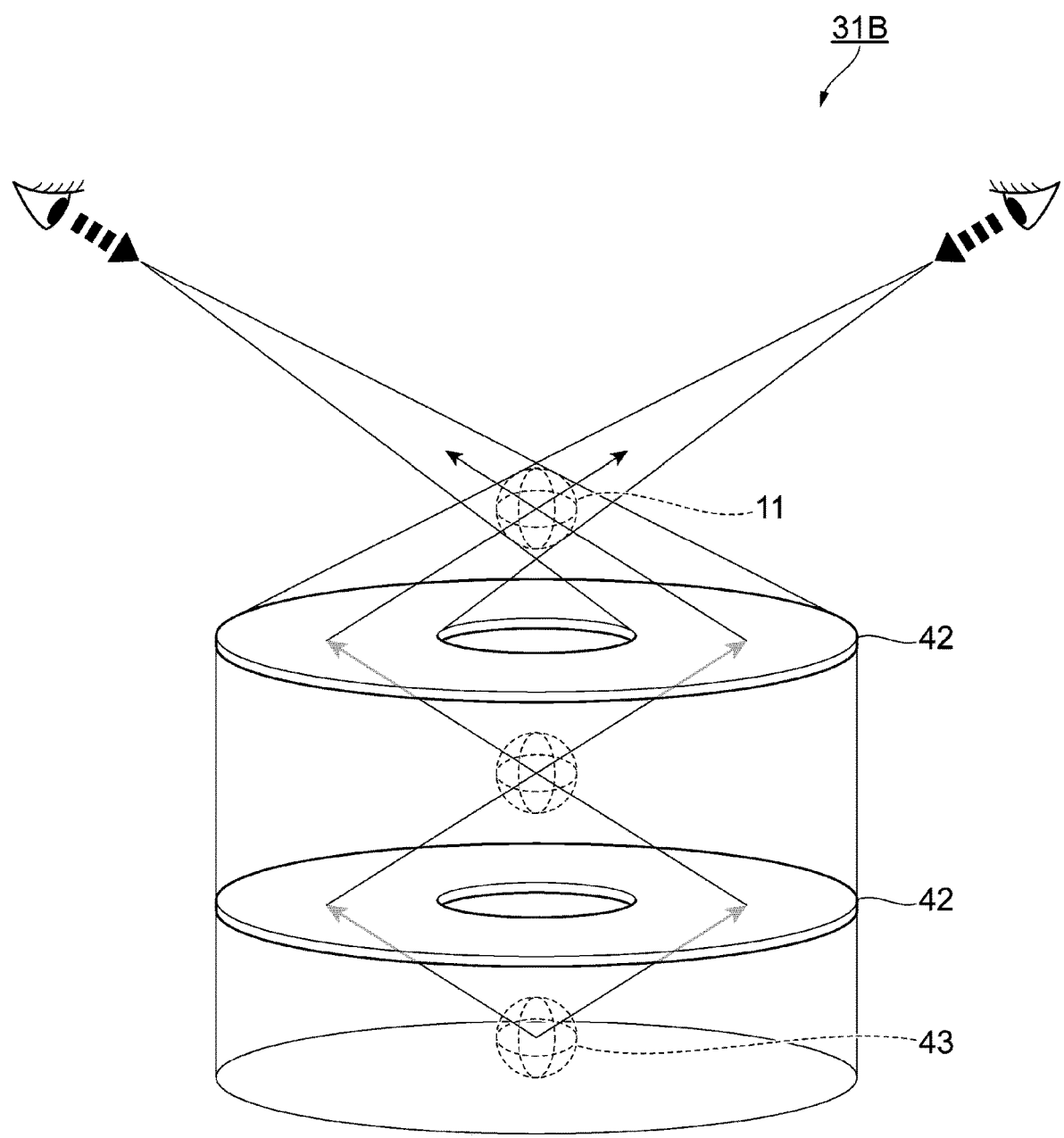
FIG. 3 is a diagram illustrating the principle of an aerial image forming apparatus that forms a three dimensional image as an aerial image.

FIG. 3 is a diagram illustrating the principle of an aerial image forming apparatus 31B forming a three dimensional image as the aerial image 11. The aerial image forming apparatus 31B causes light, which is reflected from the surface of a real object 43, to be transmitted twice through ring optical plates 42. Thus, the aerial image forming apparatus 31B reproduces a three dimensional image (the aerial image 11) in the air. The optical plates 42 are not necessarily arranged in series.

Figure 4A:
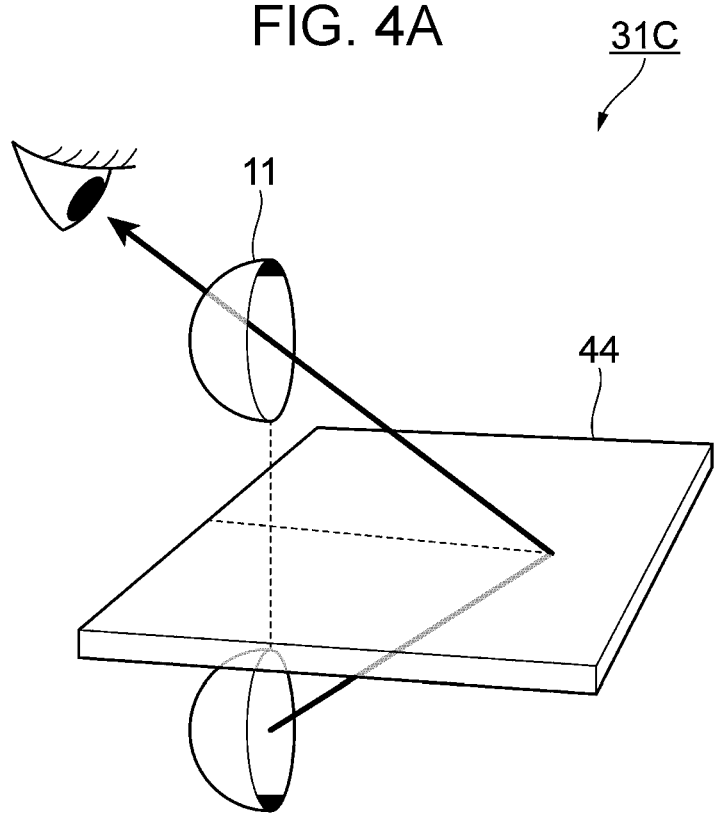
FIG. 4A is a diagram illustrating the principle of an aerial image forming apparatus that forms an aerial image by using a micromirror array having a structure in which fine square holes forming a dihedral corner reflector are arranged at equal intervals in a flat surface, and illustrating the positional relationship between each component and the aerial image.
Figure 4B:
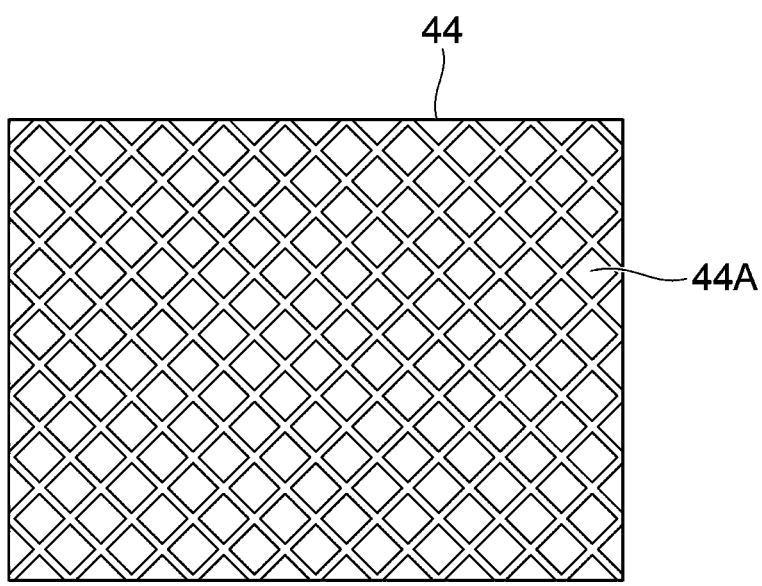
FIG. 4B is an enlarged view of a portion of the micromirror array in FIG. 4A.

FIGS. 4A and 4B are diagrams illustrating the principle of an aerial image forming apparatus 31C that forms the aerial image 11 by using a micromirror array 44. The micromirror array 44 has a structure in which fine square holes 44A, which form a dihedral corner reflector, are arranged at equal intervals in a flat surface. FIG. 4A illustrates the positional relationship between each component and the aerial image 11, and FIG. 4B is an enlarged view of a portion of the micromirror array 44. Each hole 44A is, for example, about 100 μm square. The micromirror array 44 is an exemplary optical component.

Figure 5:
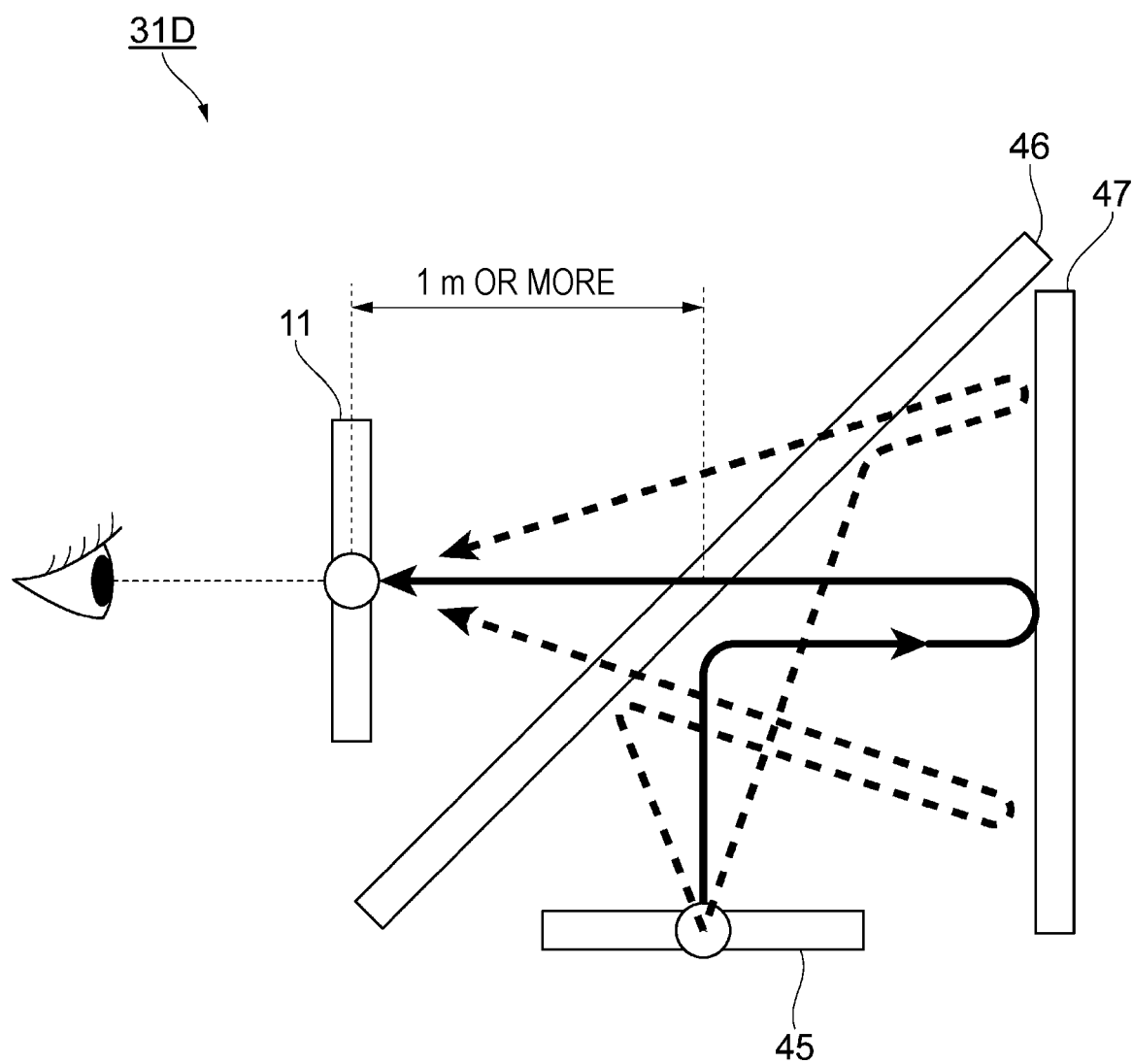
FIG. 5 is a diagram illustrating the principle of an aerial image forming apparatus using a beam splitter and a retro-reflective sheet.

FIG. 5 is a diagram illustrating the principle of an aerial image forming apparatus 31D using a beam splitter 46 and a retro-reflective sheet 47. The beam splitter 46 is disposed at an angle of 45° with respect to the display surface of a display device 45. The retro-reflective sheet 47 is disposed at an angle of 90° with respect to the display surface of the display device 45 on the side of the reflection of a display image from the beam splitter 46. The display device 45, the beam splitter 46, and the retro-reflective sheet 47 are exemplary optical components.

In the case of the aerial image forming apparatus 31D, light that is output from the display device 45 is reflected by the beam splitter 46 in the direction directed to the retro-reflective sheet 47. Then, the light is retroreflected by the retro-reflective sheet 47, and is transmitted through the beam splitter 46, forming an image in the air. The aerial image 11 is formed at a position at which the light forms an image.

Figure 6:
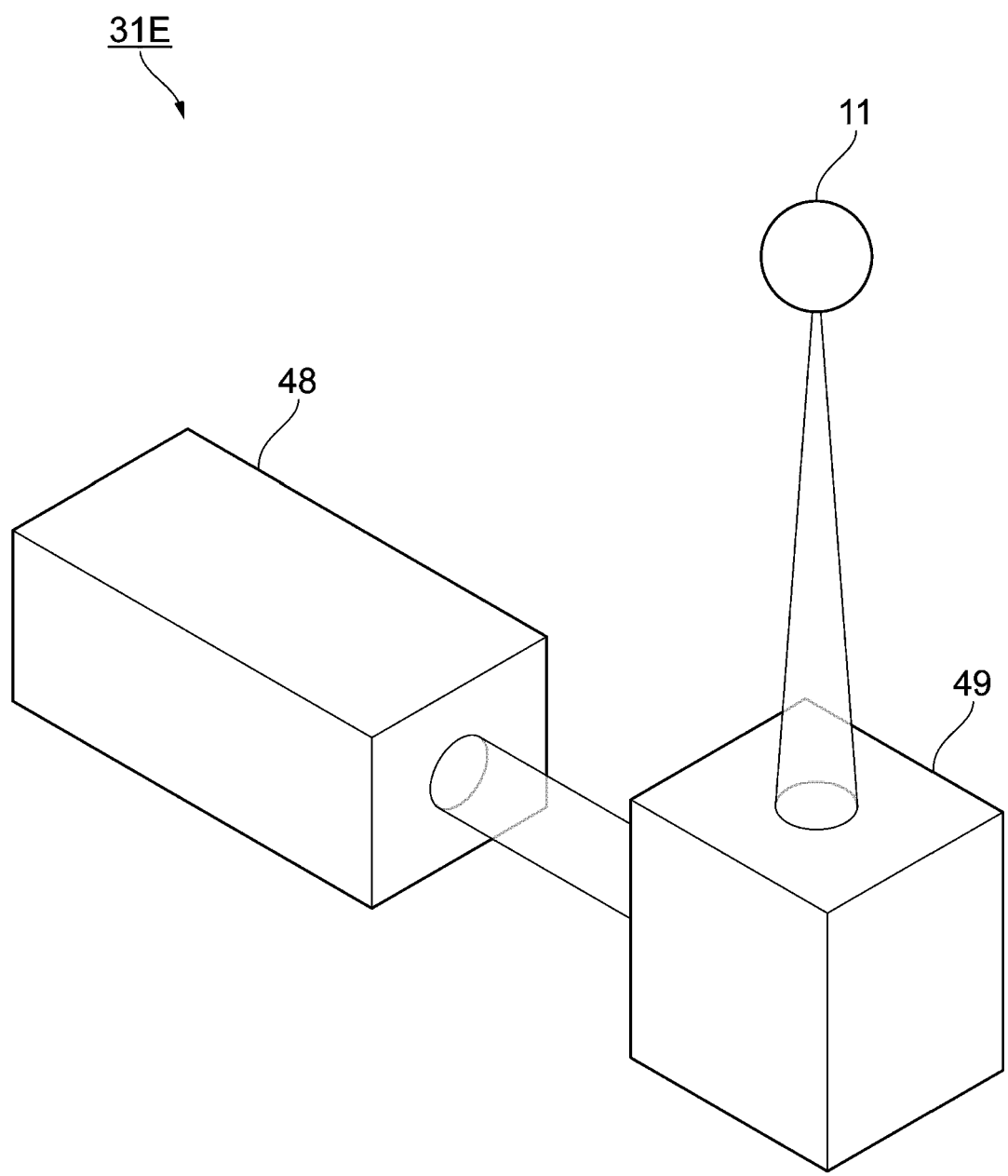
FIG. 6 is a diagram illustrating the principle of an aerial image forming apparatus that forms an aerial image as a set of plasma emissions.

FIG. 6 is a diagram illustrating the principle of an aerial image forming apparatus 31E that forms the aerial image 11 as a set of plasma emissions.

In the case of the aerial image forming apparatus 31E, an infrared pulse laser 48 outputs pulse laser beams, and an XYZ scanner 49 concentrates the pulse laser beams in the air. At that time, gas around the focus is instantaneously plasmarised, and emits light. The pulse frequency is, for example, 100 Hz or less. The pulse emission time is, for example, of the nanosecond order. The infrared pulse laser 48 and the XYZ scanner 49 are exemplary optical components.

Configuration of the Overlapping Detection Apparatus 33

Figure 7:
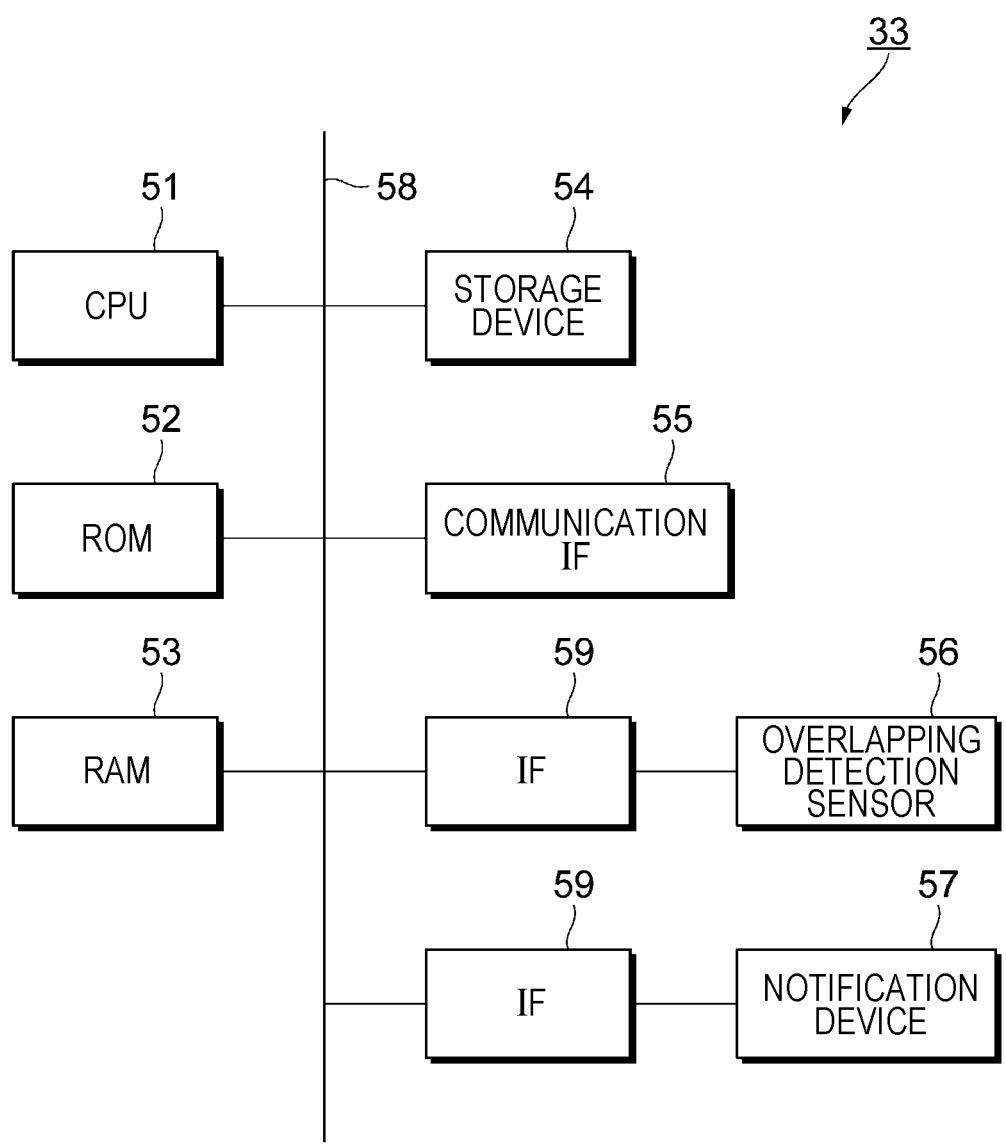
FIG. 7 is a diagram illustrating an exemplary hardware configuration of an overlapping detection apparatus according to the first exemplary embodiment.

FIG. 7 is a diagram illustrating an exemplary hardware configuration of the overlapping detection apparatus 33 according to the first exemplary embodiment.

The overlapping detection apparatus 33 includes a central processing unit (CPU) 51 that provides various functions through execution of firmware and application programs, a read only memory (ROM) 52 that is a storage area storing the firmware and a basic input output system (BIOS), and a random access memory (RAM) 53 that is an area in which programs are executed. The CPU 51, the ROM 52, and the RAM 53 are exemplary so-called computers.

The overlapping detection apparatus 33 also includes a storage device 54 that stores information displayed in the aerial images 11 and 12. The storage device 54 uses, for example, a rewritable nonvolatile recording medium for storage of information.

The overlapping detection apparatus 33 uses a communication interface (communication IF) 55 to control the aerial image forming apparatuses 31 and 32. Thus, the overlapping detection apparatus 33 changes the positions, at which the aerial images 11 and 12 are formed, in accordance with the detected overlapping state.

The overlapping detection apparatus 33 also includes an overlapping detection sensor 56 and a notification device 57. The overlapping detection sensor 56 detects information about overlapping. The notification device 57 transmits a notification about occurrence of overlapping.

The overlapping detection sensor 56 may be integrated with the body of the overlapping detection apparatus 33, or is removable from the body. In the first exemplary embodiment, for example, an imaging camera is used as the overlapping detection sensor 56. The imaging camera is used to photograph the aerial images 11 and 12.

The overlapping detection sensor 56 may be an imaging camera which does not capture the entire visible light range but which selectively captures an image in a specific wavelength region in which overlapping is conspicuous.

The overlapping detection sensor 56 captures an image of the entire area in which the aerial images 11 and 12 may be displayed, but may photograph a space portion in which overlapping is likely to occur.

The notification device 57 is used to notify an administrator or the like of occurrence of overlapping. The notification device 57 may transmit a notification through sound or visually. For example, a speaker is used for notification through sound. For example, a visual notification is provided by lighting an indicator (such as a light-emitting diode (LED)), displaying a message on a display device (not illustrated), transmitting a message to an information terminal, or the like. The notification device 57 is an exemplary notification unit.

The CPU 51 is connected to each unit through a bus 58. The overlapping detection sensor 56 and the notification device 57 are connected to the bus 58 through interfaces (IFs) 59.

Figure 8:
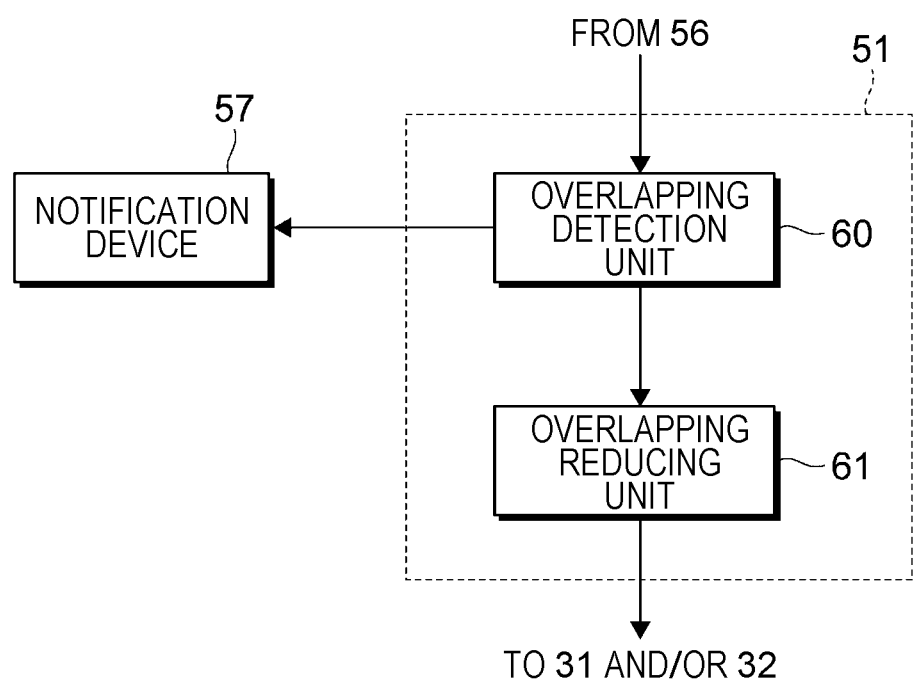
FIG. 8 is a diagram illustrating an exemplary functional configuration of the overlapping detection apparatus according to the first exemplary embodiment.

FIG. 8 is a diagram illustrating an exemplary functional configuration of the overlapping detection apparatus 33 (see FIG. 7) according to the first exemplary embodiment.

The functional configuration illustrated in FIG. 8 is implemented through the CPU 51 executing programs.

The CPU 51 functions as an overlapping detection unit 60 and an overlapping reducing unit 61. The overlapping detection unit 60 detects overlapping between the aerial images 11 and 12 (see FIG. 1) on the basis of an output signal (for example, image data) from the overlapping detection sensor 56. The overlapping reducing unit 61 controls one or both of the aerial image forming apparatuses 31 and 32 (see FIG. 1) in accordance with the detected overlapping so that the overlapping is reduced.

The overlapping detection unit 60 is an exemplary detection unit, and the overlapping reducing unit 62 is an exemplary reducing unit.

In the first exemplary embodiment, the overlapping detection unit 60 detects presence/absence of overlapping, a portion in which the overlapping occurs, the amount of overlapping, and the like by using the relationship between the areas of the aerial images 11 and 12 (specified by using coordinates), the relationship between the distance from the aerial image 11 and the distance from the aerial image 12, presence/absence of mixture of colors or an image overlying another image, or the like which are specified through processing on a captured image. Specific examples of the detection will be described below.

When the distances to the aerial images 11 and 12 are measured, a depth sensor may be used as the overlapping detection unit 60, or the distances may be calculated through image processing.

When overlapping is detected, the overlapping detection unit 60 notifies the notification device 57 and the overlapping reducing unit 61 of the detection of overlapping. The notification may include information about the position at which the overlapping occurs and the amount of overlapping.

When the overlapping detection unit 60 is used to detect overlapping, the displays in the aerial images 11 and 12 may be changed to displays for detection. The display for detection may be, for example, a color, a pattern, a design with which the overlapping detection sensor 56 easily captures an image or detects overlapping.

The display that facilitates imaging and detection of overlapping may be selected on the basis of the relationship between the aerial images 11 and 12, or may be determined in accordance with the environment of a space in which the aerial images 11 and 12 are formed.

In the first exemplary embodiment, as the display for detection of overlapping, the entire aerial images 11 and 12 are displayed in a monochrome color (including chromatic colors as well as achromatic colors). The display of fringe portions (picture frames) of the aerial images 11 and 12 may be selectively changed to monochrome display. In addition, only the display of the fringe of an area portion in which overlapping is intended not to occur may be changed to emphasized display. That is, the display for detection of overlapping may be used in areas inside the aerial images 11 and 12.

For example, primary colors (red colors, blue colors, and green colors) may be disposed in the entire aerial images 11 and 12 or an area (for example, a fringe area) in which overlapping is likely to occur. These colors are conspicuous in terms of color forming. When different primary colors overlain on each other are viewed, the color is visually recognized and captured as a different color, facilitating detection of overlapping.

For example, opposite colors (complementary colors) may be assigned to the respective aerial images 11 and 12. The opposite colors indicate colors located at opposite positions on the hue circle. For example, green colors to dark blue colors are opposite to red, or bluish green colors to purple are opposite to orange. Use of opposite colors makes the boundary between the aerial images 11 and 12 conspicuous, facilitating detection of overlapping.

In addition, for example, colors conspicuous with respect to the background located in the direction, in which the overlapping detection sensor 56 (see FIG. 7) captures an image, may be selected for the aerial images 11 and 12. For example, when the background (for example, the floor or the wall) is black, the colors of the aerial images 11 and 12 are set to white or white colors. Thus, the positions of the fringes of the aerial images 11 and 12 may be easily recognized.

In addition, for example, when the background (for example, the floor or the wall) is white, a color (for example, red, green, blue, or purple) that is expected to achieve clear color forming may be selected. Yellow colors may be easily viewed depending on the background.

The overlapping reducing unit 61 controls one or both of the aerial image forming apparatuses 31 and 32 on the basis of the information about detected overlapping (for example, the position of overlapping, and the amount of overlapping) so that the overlapping occurring between the aerial images 11 and 12 is reduced or eliminated.

The control is performed, for example, through translation or rotation of the display position of the aerial image 11, or reduction in the size of the screen, or through a combination of these.

Examples of Detection of Overlapping

First Detection Example

By using FIGS. 9 to 11, a first example in which the overlapping detection unit 60 (see FIG. 8) detects overlapping will be described.

Figure 9:
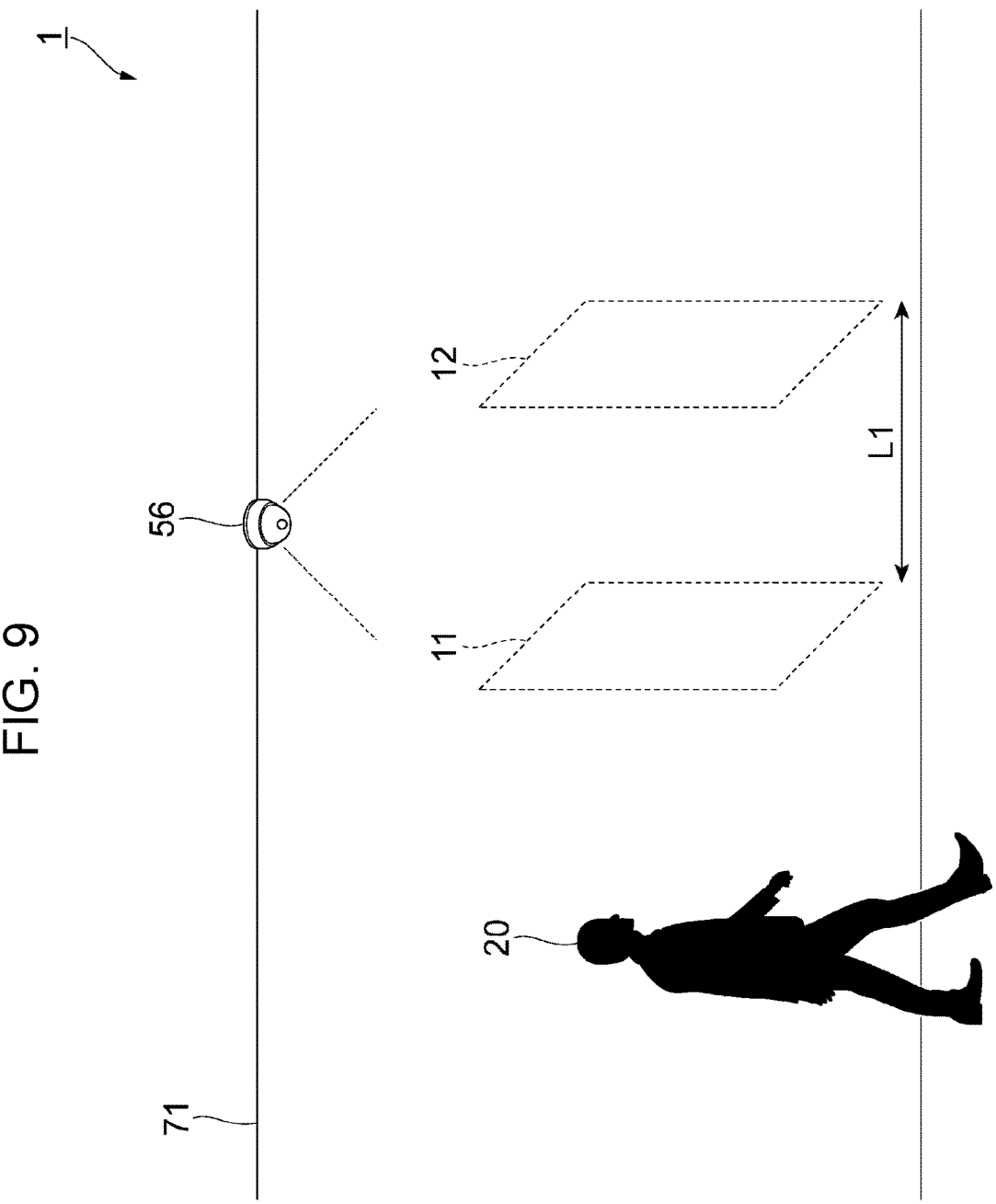
FIG. 9 is a diagram illustrating the positional relationship between an overlapping detection sensor and aerial images.

FIG. 9 is a diagram illustrating the positional relationship between the overlapping detection sensor 56 and the aerial images 11 and 12.

Figure 10A:
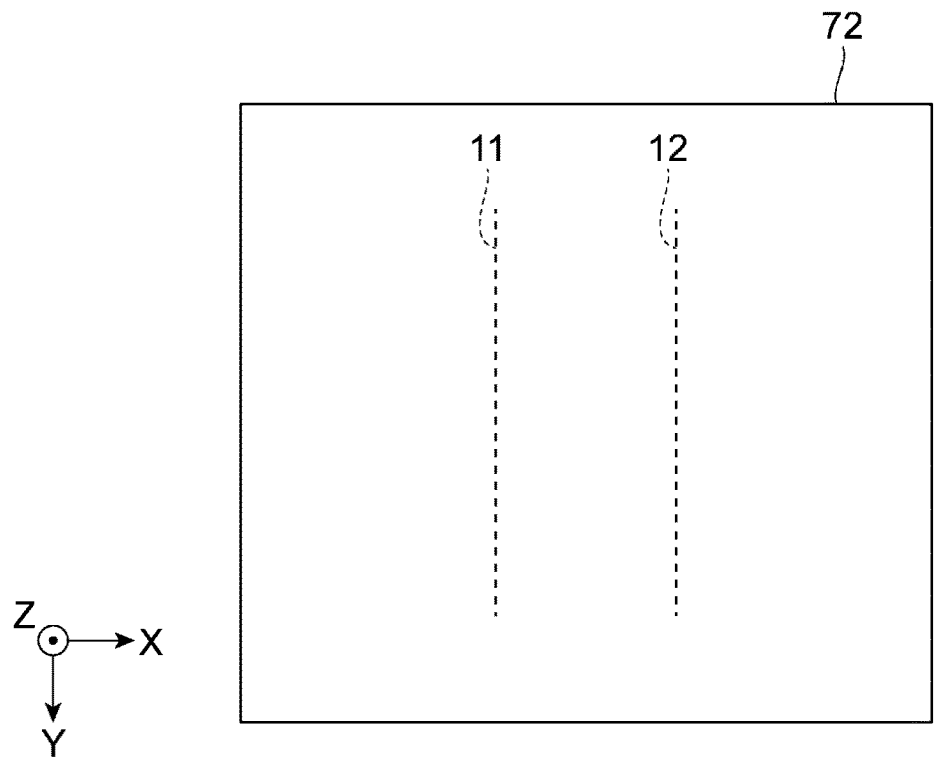
FIG. 10A is a diagram illustrating an image captured by an overlapping detection sensor when overlapping is not detected.
Figure 10B:
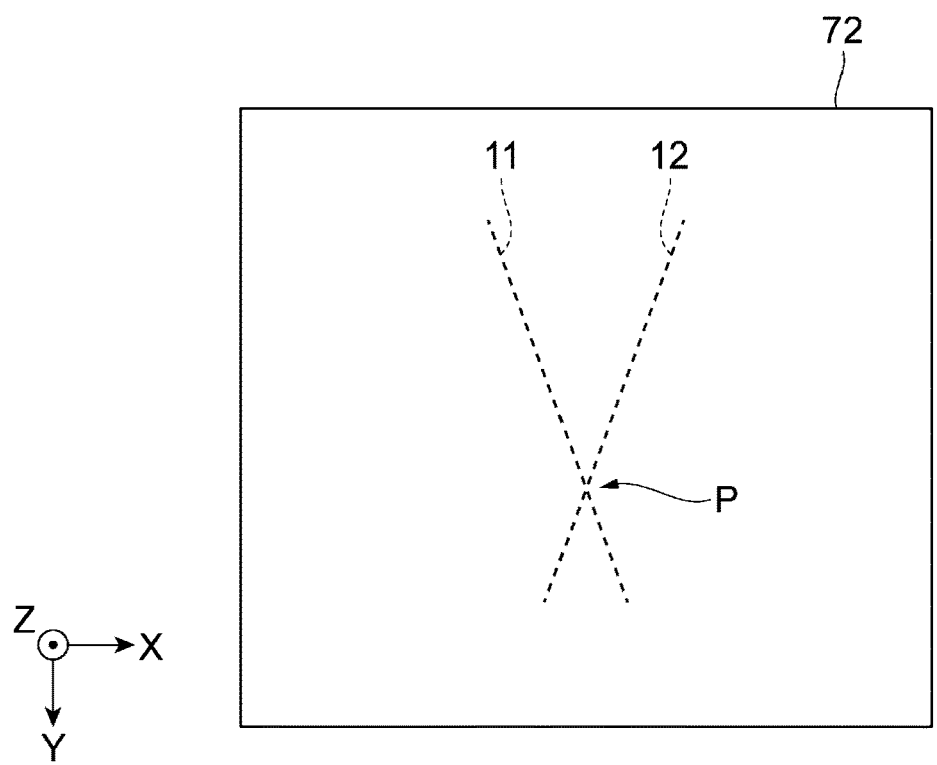
FIG. 10B is a diagram illustrating an image captured by an overlapping detection sensor when overlapping is detected.

FIGS. 10A and 10B are diagrams illustrating images 72 captured by the overlapping detection sensor 56. FIG. 10A illustrates an image 72 captured when overlapping is not detected. FIG. 10B illustrates an image 72 captured when overlapping is detected.

Figure 11:
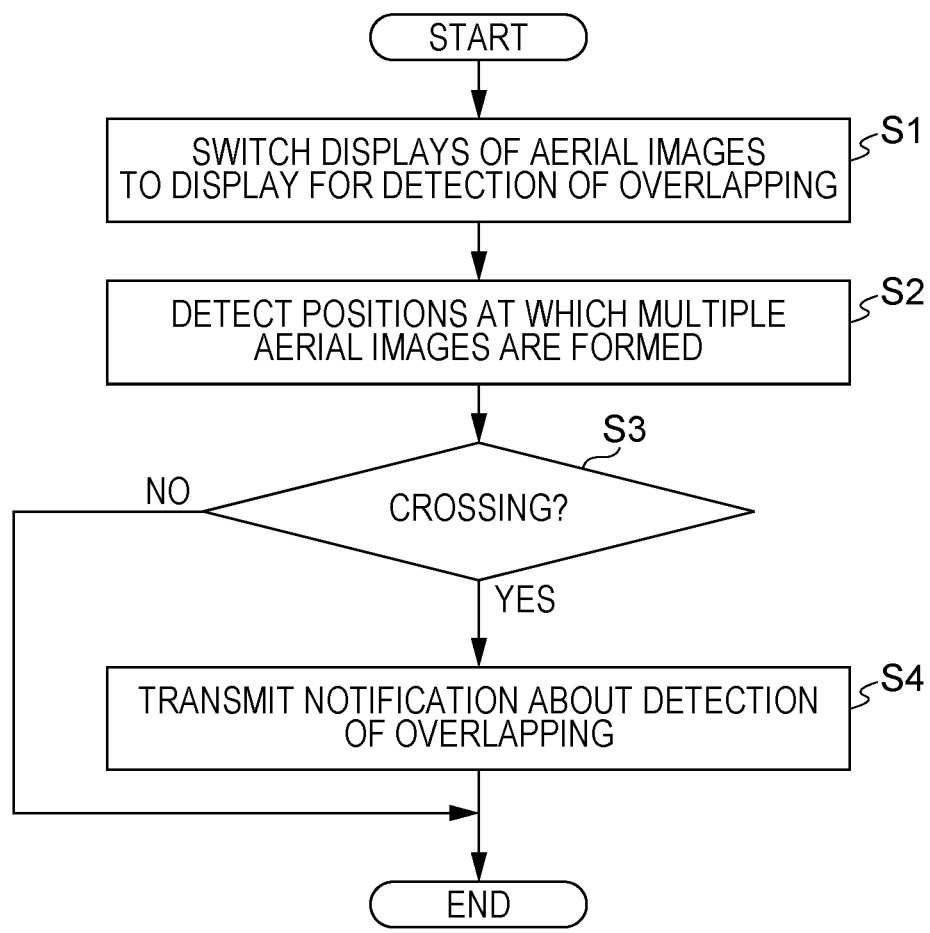
FIG. 11 is a diagram illustrating a process performed by an overlapping detection unit.

FIG. 11 is a diagram illustrating a process performed by the overlapping detection unit 60.

The first detection example describes the case where an image of the aerial images 11 and 12, which are disposed so as to be spaced apart from each other by a distance L1 in the X-axis direction, is captured from above.

In FIG. 9, the overlapping detection sensor 56 is attached to a ceiling 71. Alternatively, a supporting member, such as a base or a rod, on which the overlapping detection sensor 56 is attached, may be disposed above the aerial images 11 and 12.

As illustrated in FIG. 9, the imaging camera serving as the overlapping detection sensor 56 captures an image downward (in the −Z direction). The imaging camera is an exemplary imaging unit.

FIGS. 10A and 10B illustrate exemplary images 72 captured by the overlapping detection sensor 56. Colors conspicuous with respect to the floor which serves as the background are selected for the aerial images 11 and 12.

As illustrated in FIG. 10A, when the range in which the aerial image 11 is formed does not cross the range in which the aerial image 12 is formed, the overlapping detection unit 60 (see FIG. 8) determines that no overlapping occurs. In contrast, as illustrated in FIG. 10B, when an intersection point P is recognized between the range in which the aerial image 11 is formed and the range in which the aerial image 12 is formed, the overlapping detection unit 60 determines that overlapping occurs.

Such overlapping occurs due to an error made when the aerial image forming apparatuses 31 and 32 (see FIG. 1) are set or due to a displacement in the setting caused by an external force (for example, an earthquake, a vibration, or an impact) exerted afterward. The intersection point P is an exemplary certain position in an image.

The operations in the first detection example are performed as follows. The overlapping detection unit 60 (see FIG. 8) controls the aerial image forming apparatuses 31 and 32 (see FIG. 1) so that the displays of the aerial images 11 and 12 are switched to the display for detection of overlapping (step 1). This process may be performed only when overlapping is difficult to detect by using the display information. This switching may be performed manually.

The overlapping detection unit 60 performs image processing on an image 72 captured by the overlapping detection sensor 56, and detects the positions at which multiple aerial images (the aerial images 11 and 12) are formed (step 2).

When the positions at which the aerial images 11 and 12 are formed are detected, the overlapping detection unit 60 determines whether or not the aerial image 11 crosses the aerial image 12 (step 3).

If the determination result is positive in step 3, the overlapping detection unit 60 transmits, through the notification device 57 (see FIG. 8), a notification about the detection of overlapping (step 4).

In contrast, if the determination result is negative in step 3, the overlapping detection unit 60 ends the process without notification. Alternatively, a notification that no overlapping occurs may be transmitted.

This notification prompts an operator to perform operations. In addition, the notification may be used in adjustment in the operations.

Second Detection Example

By using FIGS. 12 to 15, a second example in which the overlapping detection unit 60 detects overlapping will be described.

Figure 12:
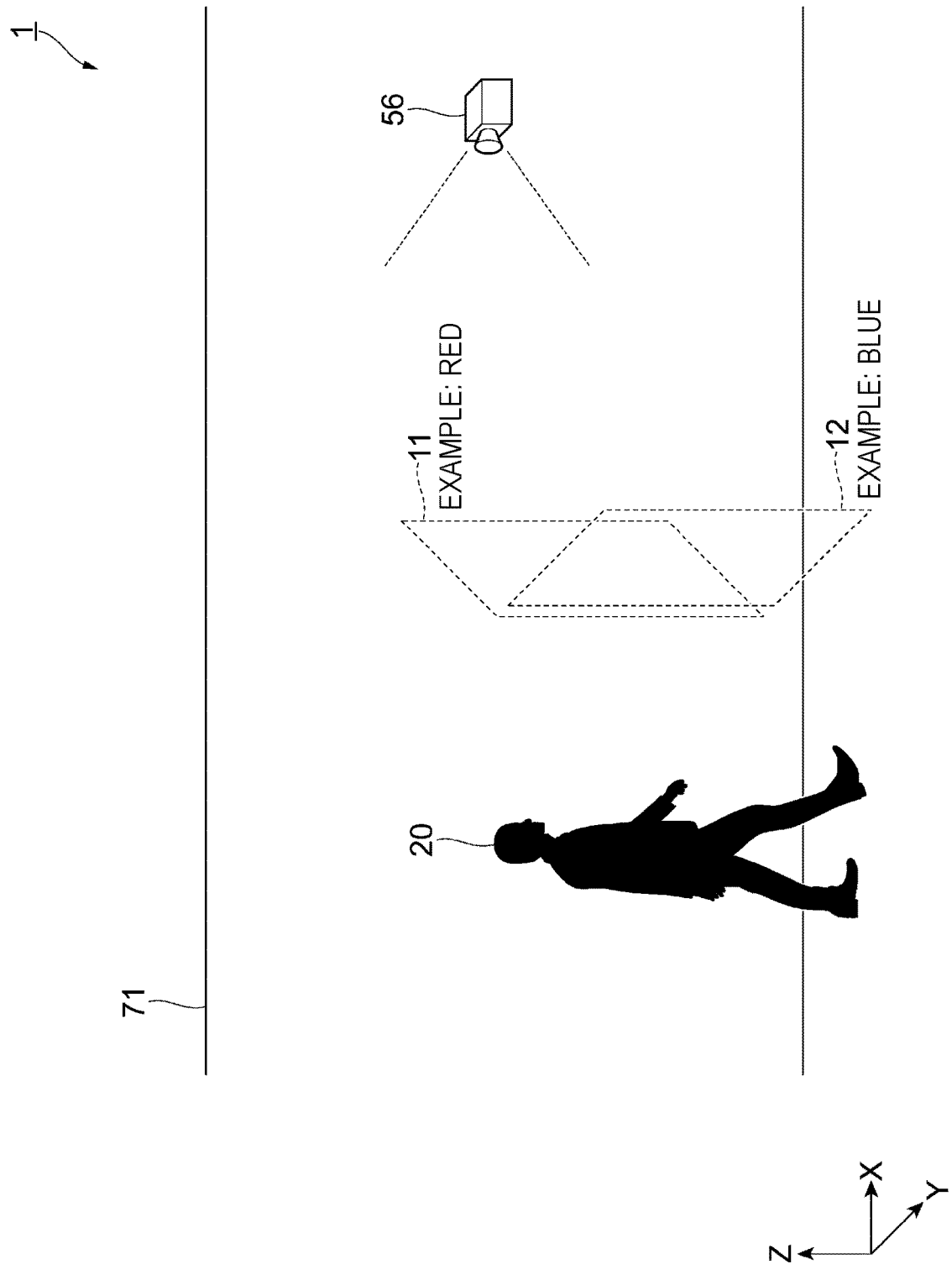
FIG. 12 is a diagram illustrating the positional relationship between an overlapping detection sensor and aerial images.

FIG. 12 is a diagram illustrating the positional relationship between the overlapping detection sensor 56 and the aerial images 11 and 12.

Figure 13A:
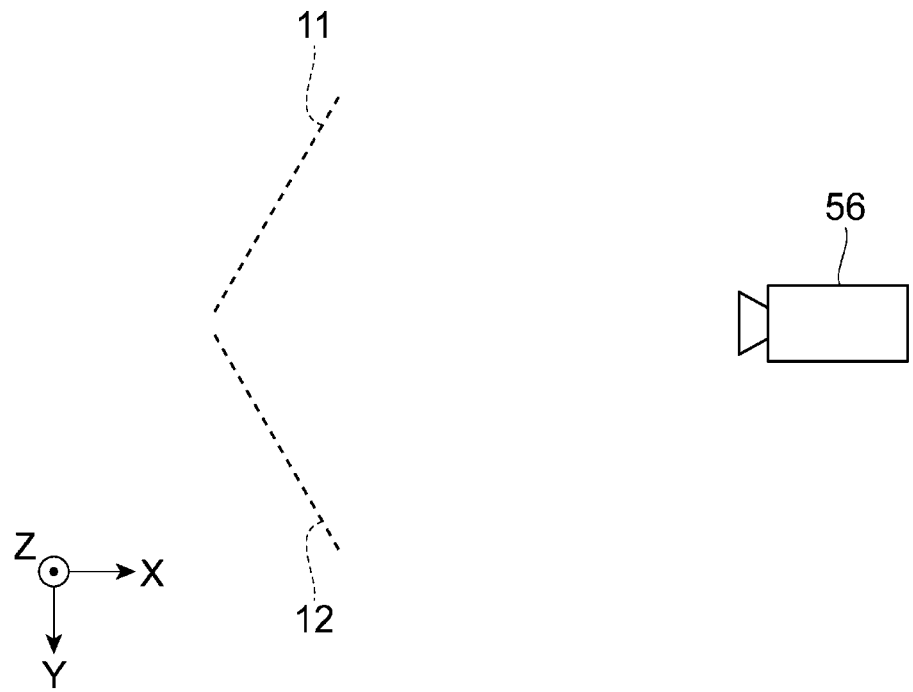
FIG. 13A is a diagram illustrating an exemplary positional relationship obtained when aerial images do not overlap each other.
Figure 13B:
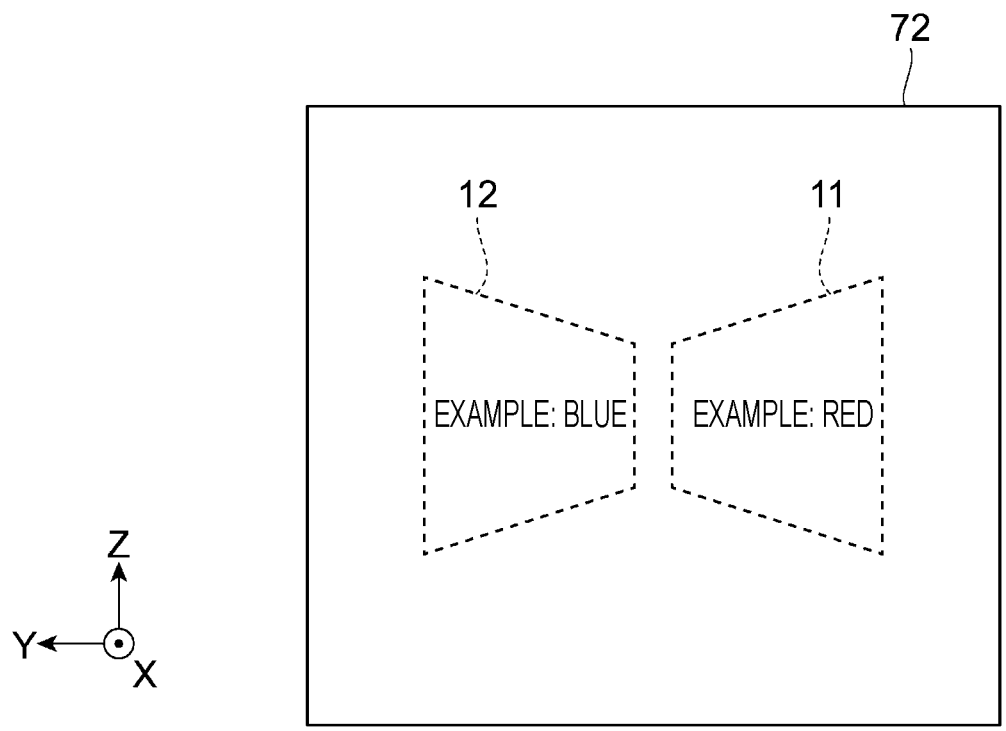
FIG. 13B is a diagram illustrating an exemplary image captured in the case of FIG. 13A.

FIGS. 13A and 13B are diagrams illustrating an example of the positional relationship and a captured image which are obtained when the aerial image 11 does not overlap the aerial image 12. FIG. 13A illustrates the state in which no overlapping occurs. FIG. 13B illustrates an exemplary image.

Figure 14A:
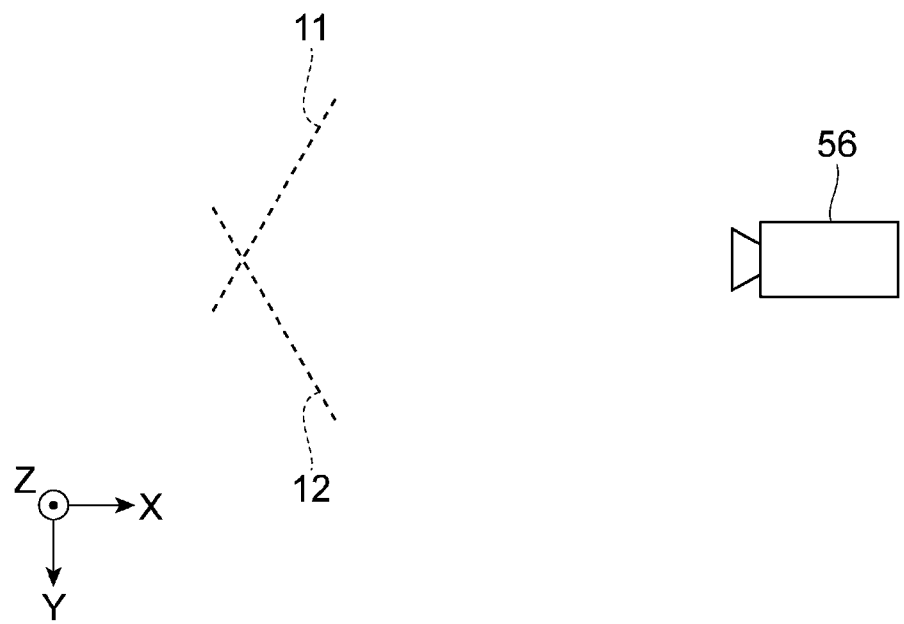
FIG. 14A is a diagram illustrating an exemplary positional relationship obtained when overlapping occurs.
Figure 14B:
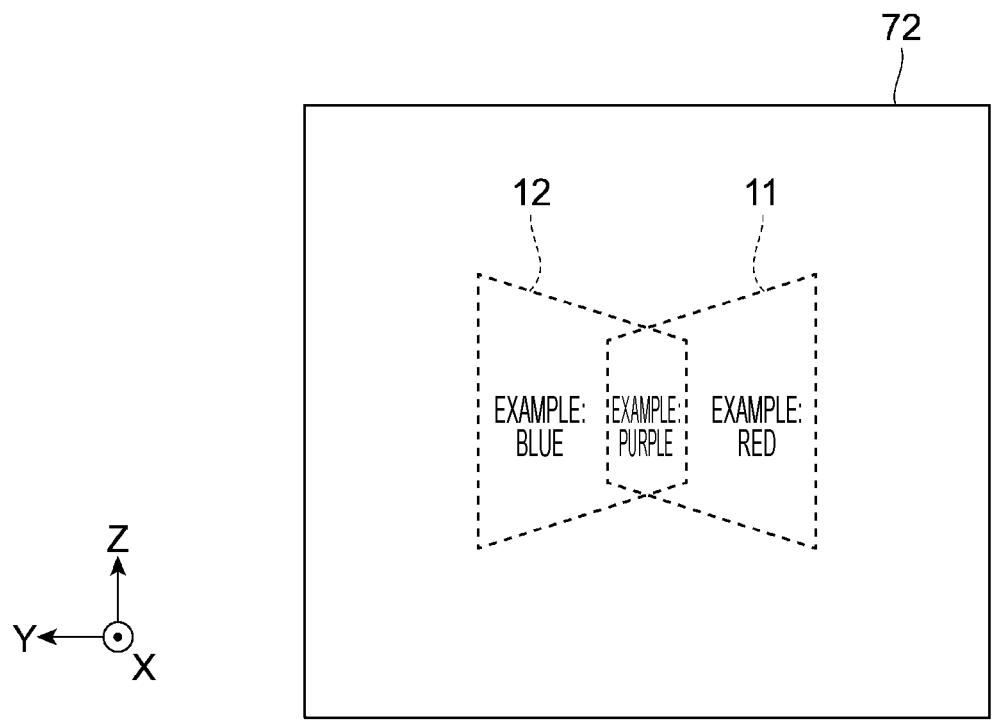
FIG. 14B is a diagram illustrating an exemplary image captured in the case of FIG. 14A.

FIGS. 14A and 14B are diagrams illustrating an example of the positional relationship and a captured image which are obtained when the aerial image 11 overlaps the aerial image 12. FIG. 14A illustrates the state in which overlapping occurs. FIG. 14B illustrates an exemplary image.

Figure 15:
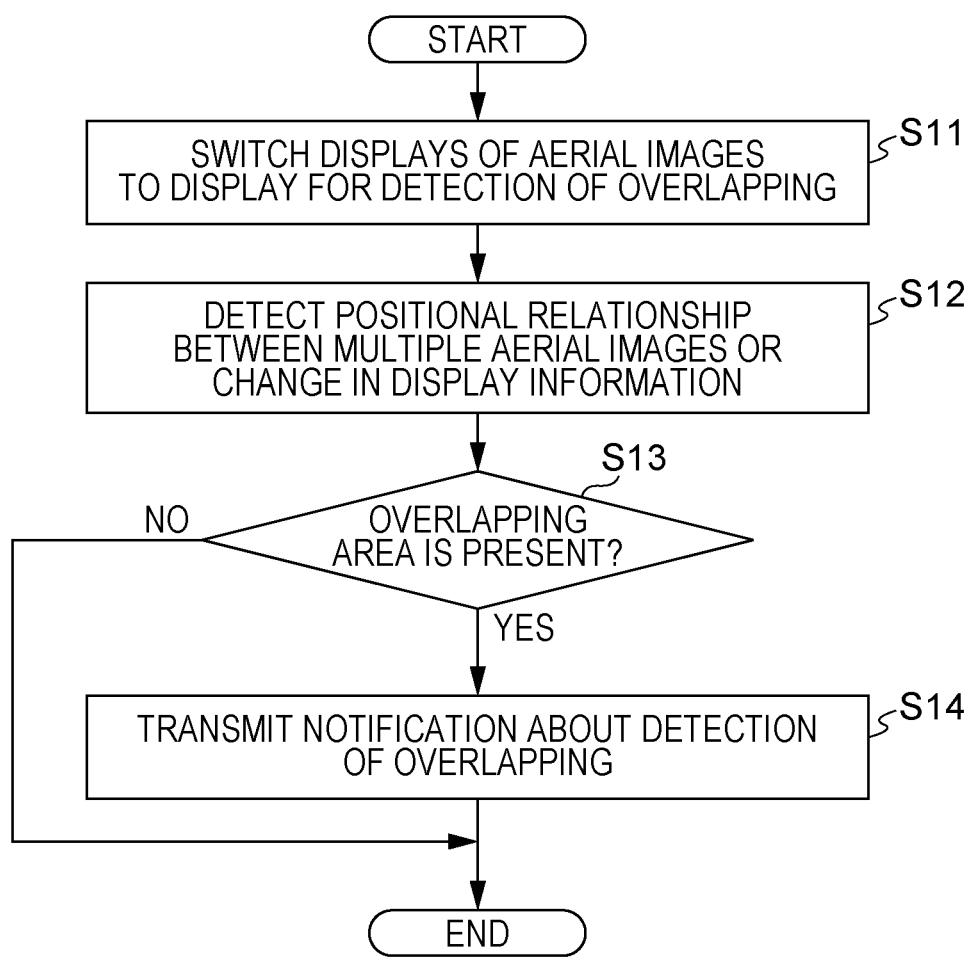
FIG. 15 is a diagram illustrating a process performed by an overlapping detection unit.

FIG. 15 is a diagram illustrating a process performed by the overlapping detection unit 60 (see FIG. 8).

In the second detection example, the aerial images 11 and 12 are disposed so as to form a V shape when viewed downward from the ceiling 71. The overlapping detection sensor 56 is disposed on the right in FIG. 12 with respect to the aerial images 11 and 12. In the second detection example, the entire display planes of the aerial images 11 and 12 are photographed.

The overlapping detection sensor 56 may be attached to a wall surface, or may be attached to a cart or a base. Alternatively, a photographer may support the overlapping detection sensor 56 with their hand.

In FIG. 12, the imaging camera serving as the overlapping detection sensor 56 is directed in the left direction (−X direction). When the imaging camera is disposed on the left in FIG. 12 with respect to the aerial images 11 and 12, the imaging camera is directed in the right direction (X direction) in FIG. 12. Alternatively, the imaging camera may be disposed at a position at which an observer observes the aerial images 11 and 12. By installing the imaging camera at the position at which observation is performed, the state (overlapping) in which visibility is reduced in observation is detected.

FIG. 13B illustrates an exemplary image 72 captured by the overlapping detection sensor 56. The aerial images 11 and 12 are formed so as to be conspicuous with respect to the background (for example, the ceiling, a wall surface, or the floor) and have display colors that are complementary to each other. In FIGS. 13A and 13B, the entire aerial image 11 is displayed in red, and the entire aerial image 12 is displayed in blue.

When there is no crossing between the aerial images 11 and 12, the aerial images 11 and 12 are separately disposed in the image 72 captured by the overlapping detection sensor 56. In this case, the overlapping detection unit 60 (see FIG. 8) determines that no overlapping occurs.

FIG. 14B illustrates an exemplary image 72 captured by the overlapping detection sensor 56.

In FIGS. 14A and 14B, the aerial image 11 crosses the aerial image 12. Therefore, in the overlapping portion in the image 72 captured by the overlapping detection sensor 56, the colors are viewed as if being mixed with each other. For example, the colors are viewed as purple. The colors are viewed as purple because the aerial image 12 on the background side is observed through the aerial image 11, or the aerial image 11 on the background side is observed through the aerial image 12.

In this case, the overlapping detection unit 60 (see FIG. 8) determines that overlapping occurs.

Instead of focusing on the color of an overlapping portion, the sizes and shapes, which are intended to be viewed in the image 72, of the aerial images 11 and 12 may be determined as frames or the like, and whether or not overlapping occurs may be detected. In other words, the positions of the fringes of the aerial images 11 and 12 in the image may be estimated, and whether or not overlapping occurs may be detected on the basis of information about the estimated positions.

The operations in the second detection example are performed as follows. The overlapping detection unit 60 (see FIG. 8) controls the aerial image forming apparatuses 31 and 32 (see FIG. 1) so that the displays of the aerial images 11 and 12 are switched to the display for inspection (step 11). This process may be performed only when overlapping is difficult to detect by using the display information.

The overlapping detection unit 60 performs image processing on an image 72 captured by the overlapping detection sensor 56, and detects the relationship between the positions at which the multiple aerial images (aerial images 11 and 12) are formed or a change in the display information (step 12).

The relationship between the positions indicates the positional relationship between the image objects in the image 72. For example, the relationship between the positions indicates the positional relationship between the area in which the aerial image 11 is displayed and the area in which the aerial image 12 is displayed, which are specified in the image processing.

An exemplary change in the display information is color mixture of the display colors of the aerial images 11 and 12. Alternatively, an exemplary change in the display information is a state in which display information in the aerial image 11 is overlain on display information in the aerial image 12 and vice versa.

On the basis of the detected information, the overlapping detection unit 60 determines whether or not there is an area in which a portion of the aerial image 11 is overlain on a portion of the aerial image 12 and vice versa (step 13).

If the determination result is positive in step 13, the overlapping detection unit 60 transmits, through the notification device 57 (see FIG. 8), a notification about the detection of overlapping (step 14).

In contrast, if the determination result is negative in step 13, the overlapping detection unit 60 ends the process without notification. Alternatively, a notification that no overlapping occurs may be transmitted.

The notification prompts an operator to perform operations. In addition, the notification may be used for adjustment in the operations.

Third Detection Example

By using FIGS. 16 to 19, a third example in which the overlapping detection unit 60 detects overlapping will be described.

FIG. 16 is a diagram illustrating the positional relationship between the overlapping detection sensors 56 and the aerial images 11 and 12.

FIGS. 17A and 17B are diagrams illustrating an example of the positional relationship and a captured image which are obtained when the aerial image 11 does not overlap the aerial image 12. FIG. 17A illustrates the state in which no overlapping occurs. FIG. 17B illustrates an exemplary image.

FIGS. 18A and 18B are diagrams illustrating an example of the positional relationship and a captured image which are obtained when the aerial image 11 overlaps the aerial image 12. FIG. 18A illustrates the state in which overlapping occurs. FIG. 18B illustrates an exemplary image.

Figure 19:
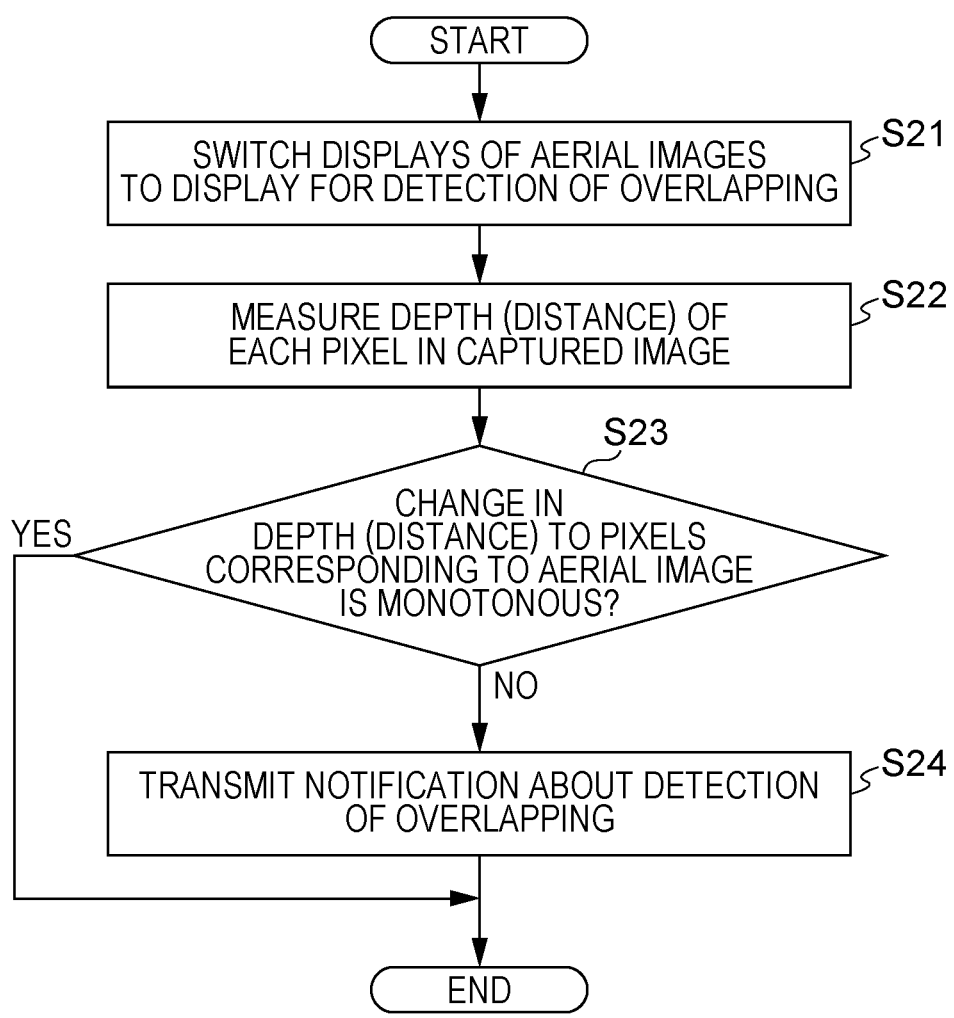
FIG. 19 is a diagram illustrating a process performed by an overlapping detection unit.

FIG. 19 is a diagram illustrating a process performed by the overlapping detection unit 60 (see FIG. 8).

In the third detection example, the aerial images 11 and 12 are disposed obliquely with respect to a wall surface when being viewed downward from the ceiling 71. The aerial images 11 and 12 are disposed parallel to each other.

In FIG. 16, two overlapping detection sensors 56 are prepared. The two overlapping detection sensors 56 photograph the aerial images 11 and 12 from a side, and obtains the distance in the depth direction measured from the detection sensors 56. In other words, information about the distance is obtained through stereo imaging.

The overlapping detection unit 60 (see FIG. 8) calculates a depth (distance) by using parallax. In this case, information about the horizontal distance (distance in the Y-axis direction) between the two sensors used in stereo imaging is necessary.

The overlapping detection sensors 56 may be attached to a wall surface, or may be attached to a cart or a base. Alternatively, a photographer may support the overlapping detection sensors 56 with their hand.

In FIG. 16, the imaging cameras serving as the overlapping detection sensors 56 photograph the images in the left direction (−X direction) from right in FIG. 16. Alternatively, the imaging cameras may photograph the images in the right direction (X direction) from left in FIG. 16.

In the first exemplary embodiment, a method of measuring a distance through image processing is basically employed. This is because, since the aerial images 11 and 12 do not exist as physical objects, a measurement technique using a method of receiving light reflected from the surface of an object is incapable of being used.

Alternatively, objects for reflection may be disposed at the positions at which the aerial images 11 and 12 are displayed, and the distances to the objects may be measured. Thus, the distances to the aerial images 11 and 12 may be measured.

FIG. 17B illustrates an exemplary image 72 obtained through stereo imaging performed by using the two overlapping detection sensors 56. The aerial images 11 and 12 are formed so as to be conspicuous with respect to the background (for example, the ceiling, a wall surface, or the floor). Alternatively, as in the second detection example, the aerial images 11 and 12 may have colors complementary to each other.

When the aerial image 11 does not cross the aerial image 12, the overlapping detection unit 60 (see FIG. 8) uses two images 72 captured by the two overlapping detection sensors 56, so as to calculate the depths of pixels corresponding to the aerial image 12 located on the near side. If the distance L2 which is measured along a row of pixels (a long dashed short dashed line 73 in FIG. 17B) located at a certain height changes monotonously in the Y-axis direction, this indicates that no overlapping occurs. In the example in FIGS. 17A and 17B, the distance L2 increases monotonously in the Y-axis direction.

FIG. 18B illustrates an exemplary image 72 obtained through stereo imaging performed by using the two overlapping detection sensor 56.

In FIGS. 18A and 18B, the aerial image 11 crosses the aerial image 12 in a space. Therefore, the image located on the near side is formed by switching from one image to the other at the crossing portion. For example, in the Y-axis direction, the aerial image 11 is located on the near side relative to the aerial image 12 in a portion extending from the crossing portion. However, the aerial image 12 is located on the near side relative to the aerial image 11 in a portion extending to the crossing portion. Therefore, the distance L2 which is measured along a row of pixels (the long dashed short dashed line 73 in FIG. 18B) located at a certain height increases to a certain point and conversely decreases from the certain point in the Y-axis direction. The overlapping detection unit 60 (see FIG. 8) which detects the change in the distance L2 determines that overlapping occurs.

The operations in the third detection example are performed as follows. The overlapping detection unit 60 (see FIG. 8) controls the aerial image forming apparatuses 31 and 32 (see FIG. 1) so that the displays of the aerial images 11 and 12 are switched to the display for detection of overlapping (step 21). This process may be performed only when overlapping is difficult to detect by using the display information.

The overlapping detection unit 60 performs image processing on images 72 captured by the two overlapping detection sensors 56, and measures the depth (distance) of each pixel in the images 72 (step 22).

The overlapping detection unit 60 determines whether or not a change in the depth (distance) to pixels corresponding to the aerial image 11 or the aerial image 12 is monotonous (step 23). The determination about whether or not a change in the depth (distance) is monotonous is made in a direction in which overlapping is likely to occur. For example, the determination may be made in the vertical direction (Z-axis direction) of the image 72.

Multiple directions may be used in the determination. When multiple directions are used in the determination, if monotonous decrease or monotonous increase is not observed in any of the multiple directions, it is determined that overlapping occurs.

If the determination result is negative in step 23, the overlapping detection unit 60 transmits, through the notification device 57 (see FIG. 8), a notification about the detection of overlapping (step 24).

In contrast, if the determination result is positive in step 23, the overlapping detection unit 60 ends the process without notification. Alternatively, a notification that no overlapping occurs may be transmitted.

The notification prompts an operator to perform operations. In addition, the notification may be used in adjustment in the operations.

Fourth Detection Example

By using FIGS. 20A to 21, a fourth example in which the overlapping detection unit 60 detects overlapping will be described. In the fourth detection example, like the third detection example, overlapping is determined in accordance with the depths (distances) of pixels corresponding to the aerial images 11 and 12.

Figure 20A:
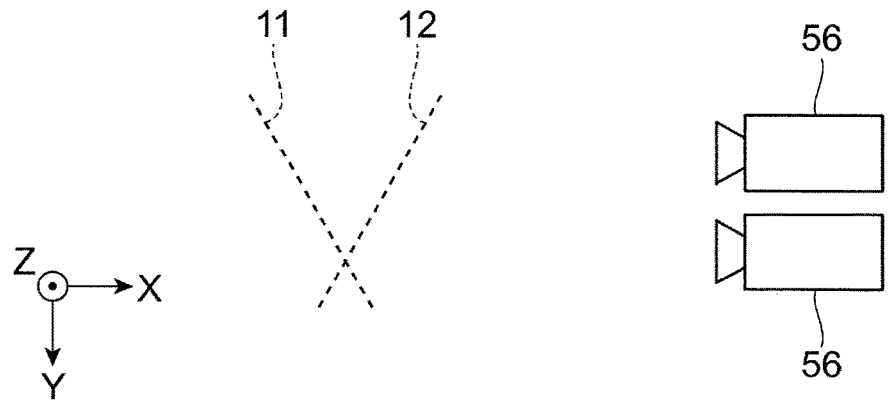
FIG. 20A is a diagram illustrating a method of measuring the depths (distances) of pixels corresponding to aerial images, and illustrating the state before start of the measurement.
Figure 20B:
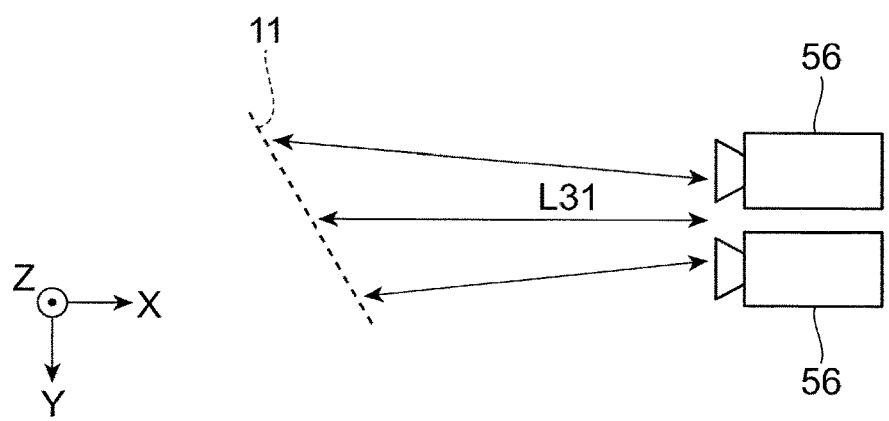
FIG. 20B is a diagram illustrating measurement of the depths (distances) of pixels corresponding to an aerial image in FIG. 20A.
Figure 20C:
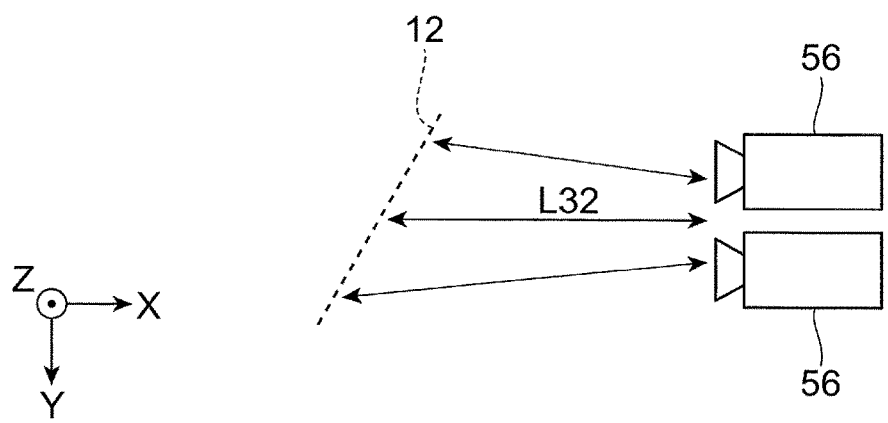
FIG. 20C is a diagram illustrating measurement of the depths (distances) of pixels corresponding to an aerial image in FIG. 20A.

FIGS. 20A to 20C are diagrams illustrating a method of measuring the depths (distances) of pixels corresponding to the aerial images 11 and 12. FIG. 20A illustrates the state obtained before start of measurement. FIG. 20B illustrates measurement of the depths (distances) of pixels corresponding to the aerial image 11. FIG. 20C illustrates measurement of the depths (distances) of pixels corresponding to the aerial image 12.

Figure 21:
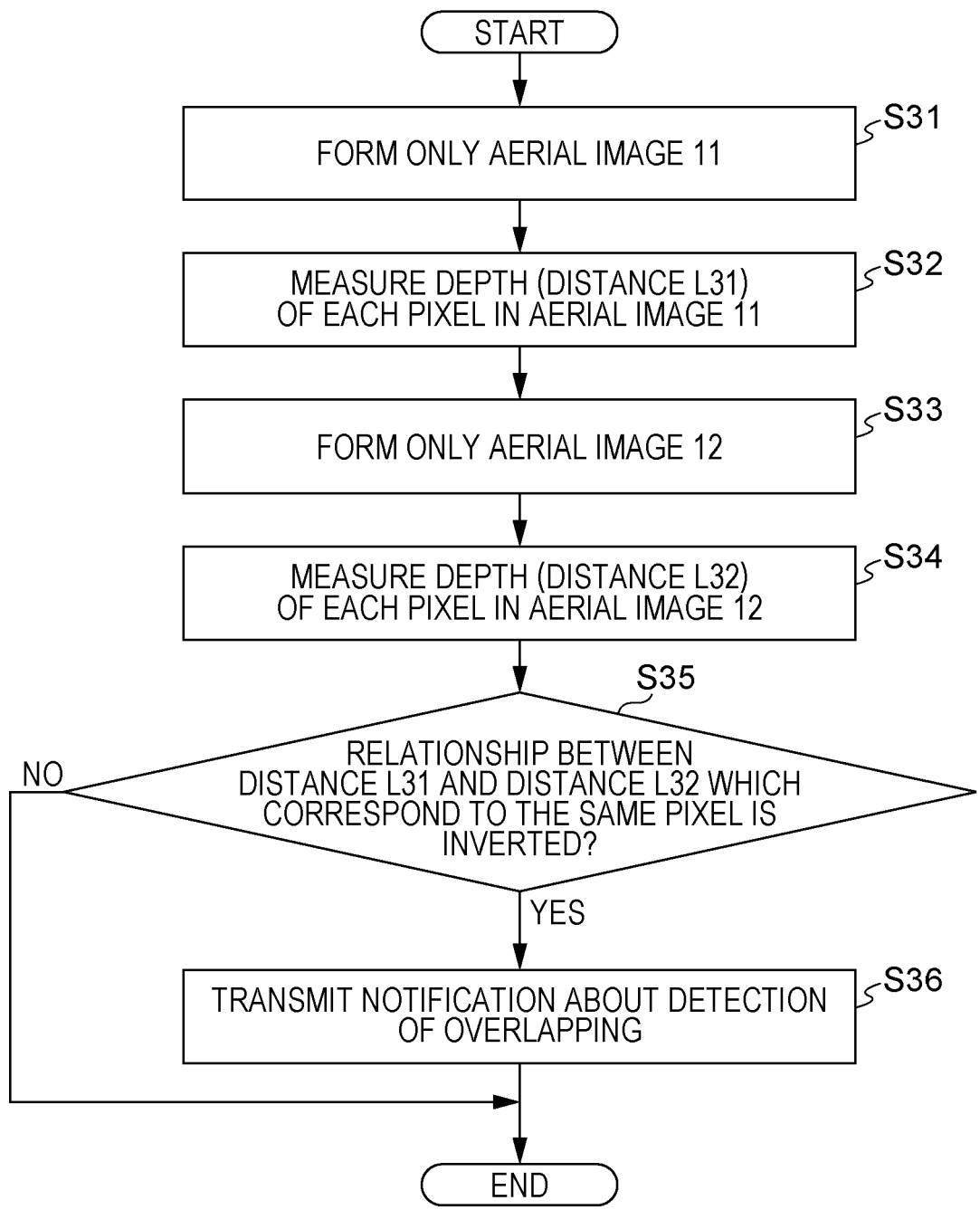
FIG. 21 is a diagram illustrating a process performed by an overlapping detection unit.

FIG. 21 is a diagram illustrating a process performed by the overlapping detection unit 60 (see FIG. 8).

Also in the case of the fourth detection example, the aerial images 11 and 12 are disposed similarly to the arrangement in FIG. 16. That is, when viewed downward from the ceiling 71 (see FIG. 16), the aerial images 11 and 12 are disposed parallel to each other so as to be oblique with respect to a wall surface.

Also in the case of the fourth detection example, two overlapping detection sensors 56 are prepared, and information about distances in the depth direction is obtained.

In the fourth detection example, the aerial images 11 and 12 are separately formed. The distances to the aerial image 11 and the distances to the aerial image 12 are separately measured. Also in the case of the fourth detection example, distances are measured by using stereo imaging performed by the two overlapping detection sensors 56.

Therefore, in the fourth detection example, the depths (distance L31) to pixels for displaying the aerial image 11 and the depths (distance L32) to pixels for displaying the aerial image 12 are separately measured. The distance L31 is an exemplary first distance, and the distance L32 is an exemplary second distance.

If overlapping between the aerial images 11 and 12 does not occur, the relationship of the depths (distances L31 and L32) measured for the same pixel is not to be inverted. In other words, at the positions of all of the pixels, the distance L31 is to be longer than the distance L32. That is, the expression, L31>L32, is to be satisfied.

In contrast, if overlapping between the aerial images 11 and 12 occurs, the front-rear (near-far) relationship between the aerial images 11 and 12 is inverted. That is, the relationship between the depths (distances L31 and L32) measured for the same pixel is inverted. In other words, the distance L31 is longer than the distance L32 for an identical pixel, and is shorter than the distance L32 for another identical pixel.

The operations performed in the fourth detection example are performed as follows. The overlapping detection unit 60 (see FIG. 8) controls the aerial image forming apparatus 31 (see FIG. 1) so that only the aerial image 11 is formed (step 31).

Then, the overlapping detection unit 60 uses the two overlapping detection sensors 56 to perform stereo imaging on the aerial image 11, and measures the depth (distance L31) of each pixel in the image (step 32).

The overlapping detection unit 60 controls the aerial image forming apparatus 32 (see FIG. 1) so that only the aerial image 12 is formed (step 33).

Then, the overlapping detection unit 60 uses the two overlapping detection sensors 56 to perform stereo imaging on the aerial image 12, and measures the depth (distance L32) of each pixel in the image (step 34).

When the distance L31 and the distance L32 are obtained, the overlapping detection unit 60 determines whether or not the relationship between the distance L31 and the distance L32 which correspond to the same pixel becomes inverted (step 35).

If the determination result is positive in step 35, the overlapping detection unit 60 transmits, through the notification device 57 (see FIG. 8), a notification about the detection of overlapping (step 36).

In contrast, if the determination result is negative in step 35, the overlapping detection unit 60 ends the process without notification. Alternatively, a notification that no overlapping occurs may be transmitted.

This notification prompts an operator to perform operations. In addition, the notification may be used in adjustment in the operations.

Examples of Reducing Overlapping

Exemplary processes performed when overlapping is detected will be described below. Similar countermeasures may be performed when an administrator is to resolve overlapping manually.

First Reduction Example

A first example in which the overlapping reducing unit (see FIG. 8) reduces overlapping will be described by using FIGS. 22A to 25.

Figure 22A:
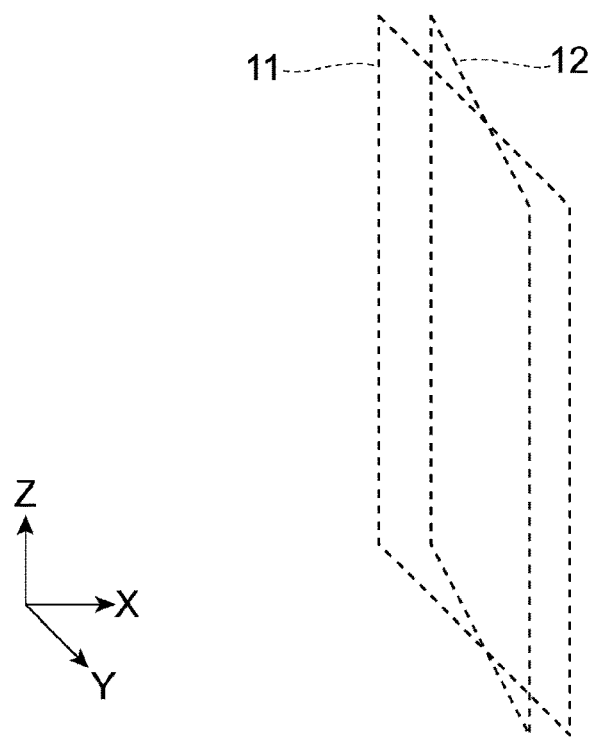
FIG. 22A is a diagram illustrating an exemplary method of resolving a crossing of aerial images, and illustrating the initial state.
Figure 22B:
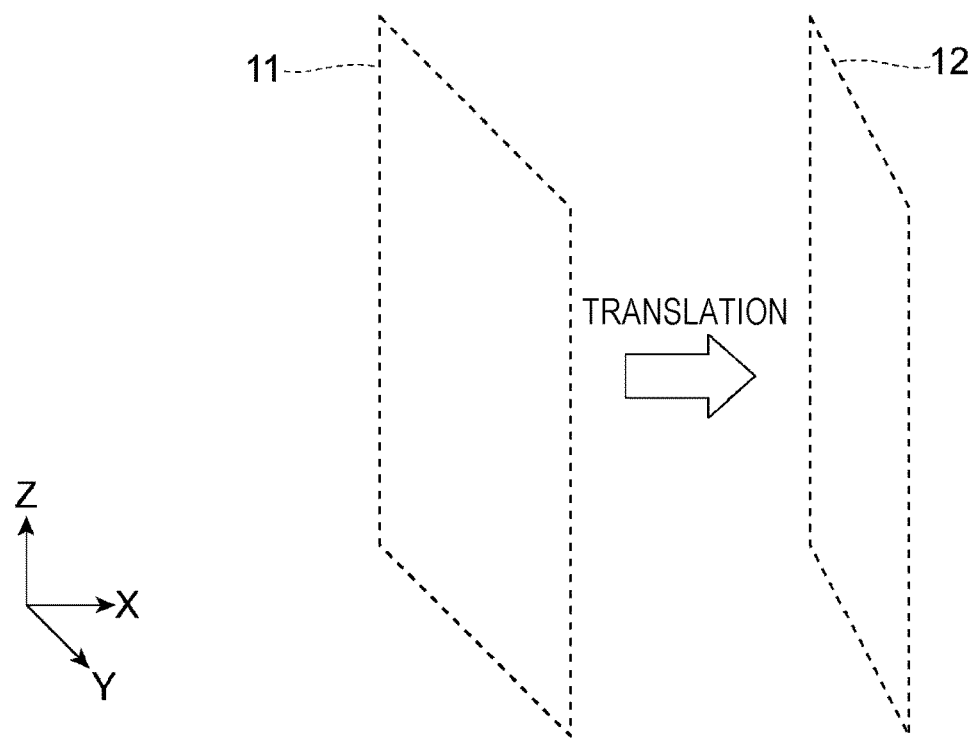
FIG. 22B is a diagram illustrating an example in which the crossing in FIG. 22A is resolved through translation.

FIGS. 22A and 22B are diagrams illustrating an exemplary method of resolving a crossing between the aerial images 11 and 12. FIG. 22A illustrates the initial state. FIG. 22B illustrates an example of resolving a crossing through translation.

FIGS. 23A and 23B are diagrams illustrating another exemplary method of resolving a crossing between the aerial images 11 and 12. FIG. 23A illustrates the initial state. FIG. 23B illustrates an example of resolving a crossing through translation.

Figure 24:
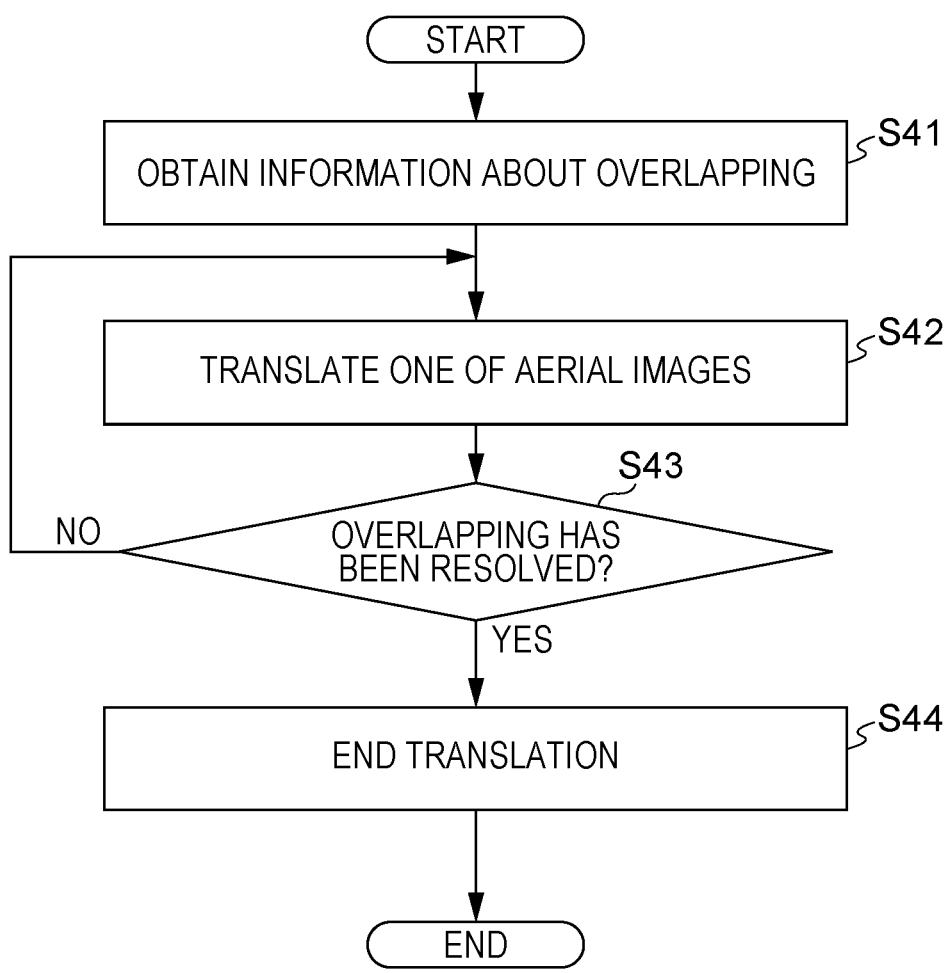
FIG. 24 is a diagram illustrating a process performed by an overlapping reducing unit.

FIG. 24 is a diagram illustrating a process performed by the overlapping reducing unit 61.

Figure 25:
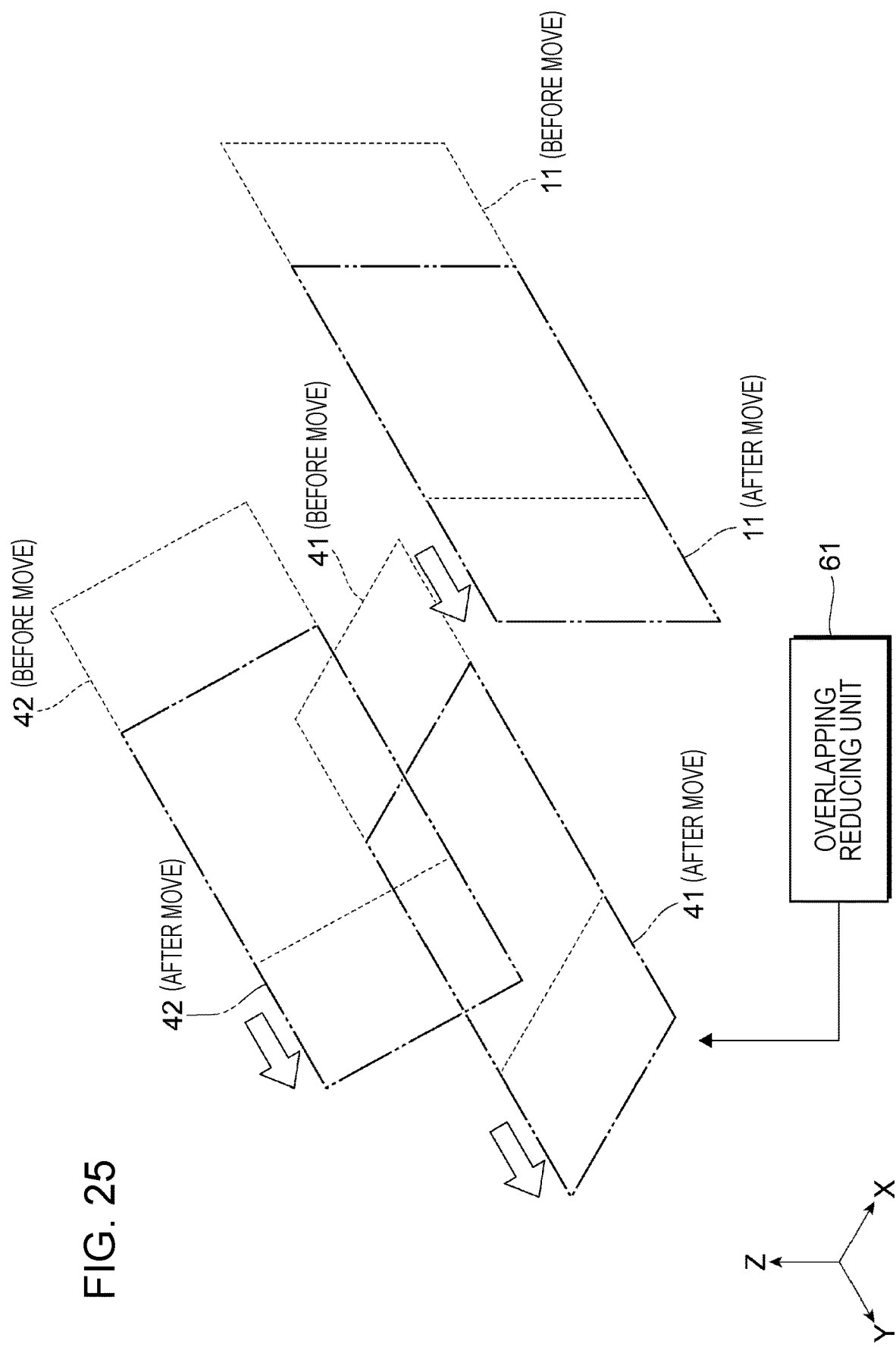
FIG. 25 is a diagram illustrating a method of translating an aerial image.

FIG. 25 is a diagram illustrating a method of translating the aerial image 11.

In the first reduction example, the aerial image 11 is not moved, and the aerial image 12 is translated, causing the overlapping to be resolved.

In the example illustrated in FIGS. 22A and 22B, the height position at which the aerial image 12 is formed in the space is not changed, and the aerial image 12 is translated across the floor (XY plane), causing the overlapping to be resolved. In FIGS. 22A and 22B, the aerial image 12 is translated in the X-axis direction. However, the aerial image 12 may be translated in any direction.

In the example illustrated in FIGS. 23A and 23B, without being moved relative to the floor (XY plane), the aerial image 12 is translated in the height direction. In FIGS. 23A and 23B, the aerial image 12 is translated in the Z-axis direction (upward). Alternatively, the aerial image 12 may be moved downward.

The operations in the first reduction example are performed as follows. The overlapping reducing unit 61 (see FIG. 8) obtains, from the overlapping detection unit 60 (see FIG. 8), information about overlapping (step 41). The information about overlapping includes information about presence/absence of overlapping, the position of overlapping, and the positional relationship between the aerial images 11 and 12 in the space.

The overlapping reducing unit 61 translates one of the aerial images (for example, the aerial image 12) so that the overlapping is resolved (step 42). The move direction is determined on the basis of the obtained information.

The overlapping reducing unit 61 determines whether or not the overlapping has been resolved through the move (step 43).

If the determination result is negative in step 43, the overlapping reducing unit 61 returns to step 42, and continuously translates the image.

In contrast, if the determination result is positive in step 43 (if the overlapping has been resolved), the overlapping reducing unit 61 ends the translation (step 44).

In FIG. 24, one of the aerial images 11 and 12 is translated. Alternatively, both the images may be moved in such directions that the images go away from each other.

In FIG. 24, the image is continuously moved until overlapping between the aerial images 11 and 12 does not occur. Alternatively, the control may be stopped at a stage at which the overlapping is reduced compared with the initial state. In other words, if overlapping is reduced, the control may be stopped before no overlapping occurs.

FIG. 25 illustrates an exemplary method, which is performed by the overlapping reducing unit 61, of implementing translation of the aerial image 11. In FIG. 25, the case in which the aerial image 11 is formed by using the method illustrated in FIG. 2 is assumed.

In this example, a move mechanism (not illustrated) is used to translate the display device 41 and the optical plate 42 integrally. For example, a uniaxial actuator is used as the move mechanism. The display device 41 and the optical plate 42 are moved integrally along a guide mechanism (not illustrated). The amount of move and the positions after the move are detected by a position detection sensor (not illustrated)

In the case where the aerial image 11 is formed by using the method illustrated in FIG. 3 or 4, the real object may be moved. In the case where the aerial image 11 is formed by using the method illustrated in FIG. 5, the display device 45 may be moved parallel to the display plane. In the case where the aerial image 11 is formed by using the method illustrated in FIG. 6, the infrared pulse laser 48 and the XYZ scanner 49 may be translated integrally.

Second Reduction Example

A second example in which the overlapping reducing unit (see FIG. 8) reduces overlapping will be described by using FIGS. 26A to 28.

Figure 26A:
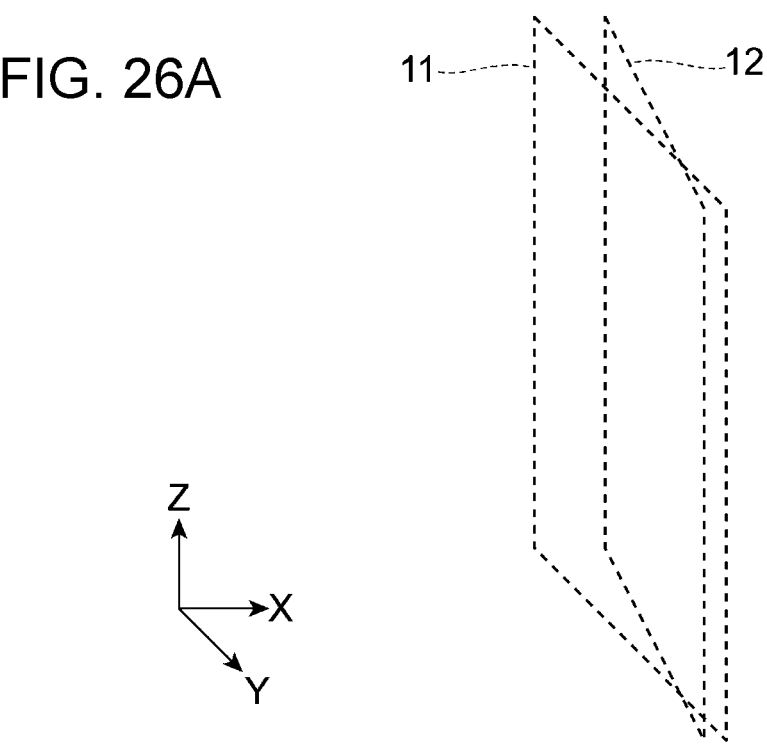
FIG. 26A is a diagram illustrating an exemplary method of resolving a crossing of aerial images, and illustrating the initial state.
Figure 26B:
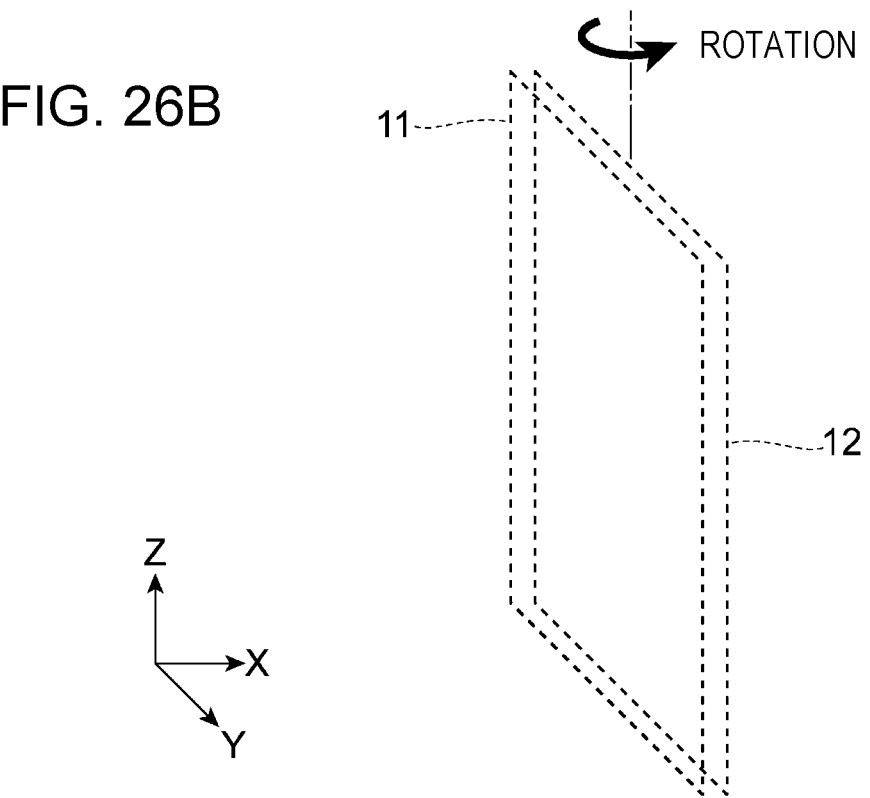
FIG. 26B is a diagram illustrating an example in which the crossing in FIG. 26A is resolved through rotation.

FIGS. 26A and 26B are diagrams illustrating an exemplary method of resolving a crossing between the aerial images 11 and 12. FIG. 26A illustrates the initial state. FIG. 26B illustrates an example in which a crossing is resolved through rotation.

Figure 27:
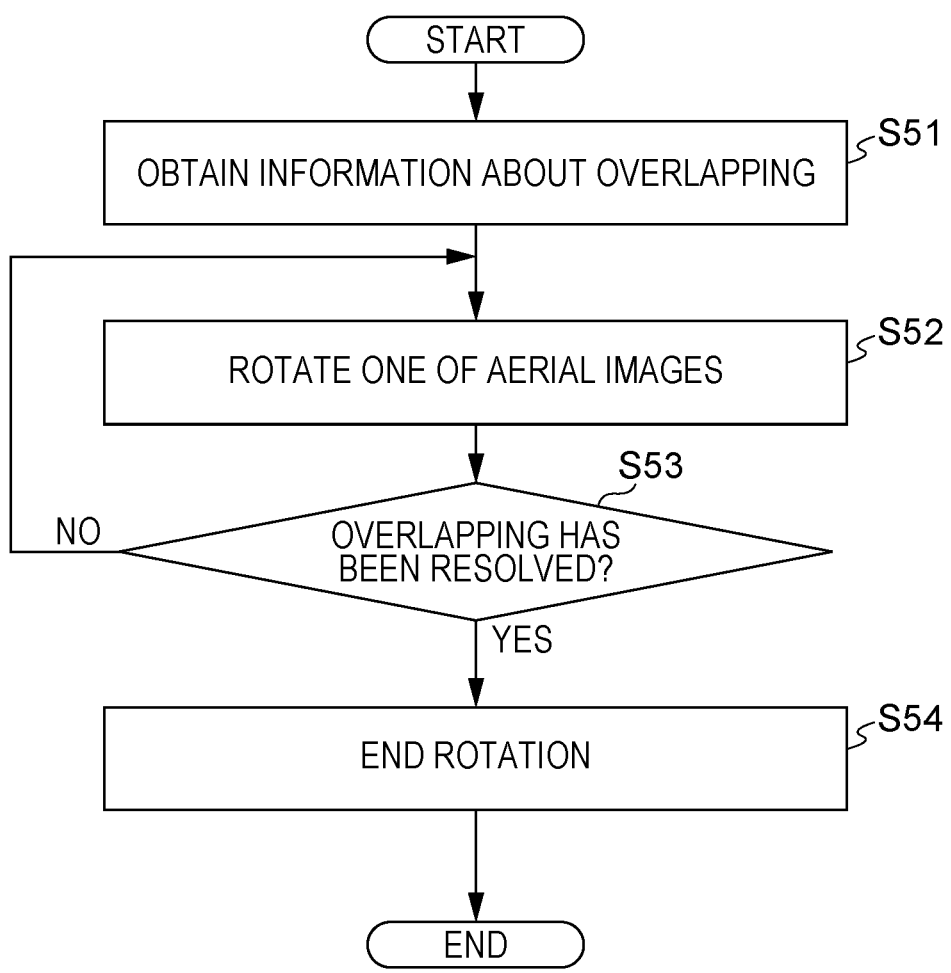
FIG. 27 is a diagram illustrating a process performed by an overlapping reducing unit.

FIG. 27 is a diagram illustrating a process performed by the overlapping reducing unit 61.

Figure 28:
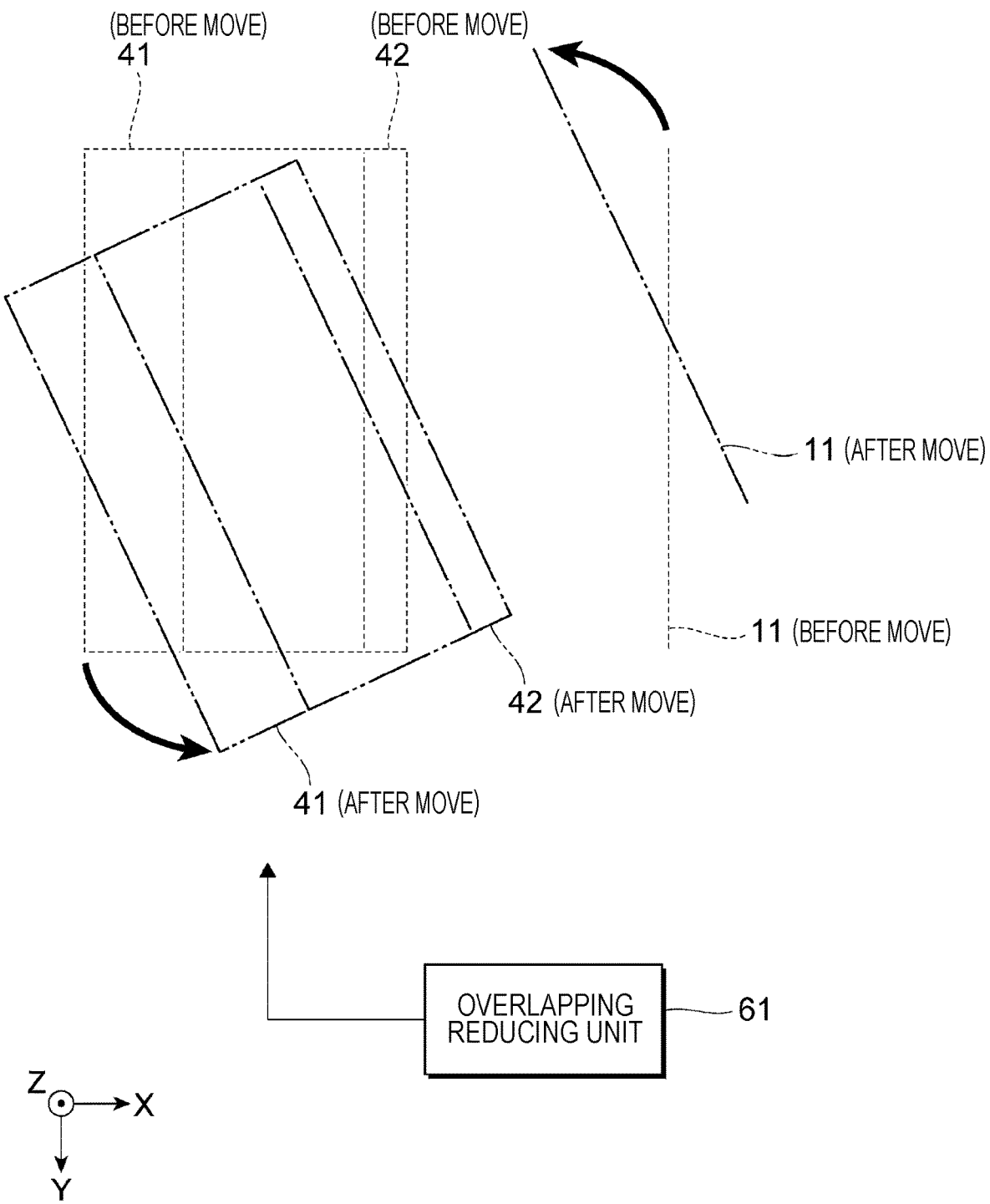
FIG. 28 is a diagram illustrating a method of rotating an aerial image.

FIG. 28 is a diagram illustrating a method of rotating the aerial image 11.

In the second reduction example, the aerial image 11 is not moved, and the aerial image 12 is rotated, causing the overlapping to be resolved.

In the example in FIGS. 26A and 26B, the aerial image 12 is rotated counterclockwise around the Z axis, causing the overlapping to be resolved. In FIGS. 26A and 26B, the aerial image 12 is rotated counterclockwise. Alternatively, the aerial image 12 may be rotated clockwise.

The operations performed in the second reduction example are performed as follows. The overlapping reducing unit 61 (see FIG. 8) obtains, from the overlapping detection unit 60 (see FIG. 8), information about overlapping (step 51). The information about overlapping includes information about presence/absence of overlapping, the position of overlapping, and the positional relationship between the aerial images 11 and 12 in the space.

The overlapping reducing unit 61 rotates one of the aerial images (for example, the aerial image 12) so that the overlapping is resolved (step 52). The rotational direction is determined on the basis of the obtained information.

The overlapping reducing unit 61 determines whether or not the overlapping has been resolved through rotation (step 53).

If the determination result is negative in step 53, the overlapping reducing unit 61 returns to step 52, and continuously rotates the image.

In contrast, if the determination result is positive in step 53 (if no overlapping occurs), the overlapping reducing unit 61 ends the rotation (step 54).

In FIG. 27, one of the aerial images 11 and 12 is rotated. Alternatively, both the images may be rotated so as to go away from each other.

Also in the case of FIG. 27, the image is continuously moved until no overlapping between the aerial images 11 and 12 occurs. Alternatively, the control may be stopped at a stage at which the overlapping is reduced compared with the initial state. In other words, if overlapping is reduced, the control may be stopped even before no overlapping occurs.

FIG. 28 illustrates an exemplary method, which is performed by the overlapping reducing unit 61, of implementing rotation of the aerial image 11. In FIG. 28, the case in which the aerial image 11 is formed by using the method in FIG. 2 is assumed.

In this example, a rotation mechanism (not illustrated) is used to rotate the display device 41 and the optical plate 42 integrally. For example, a motor is used as the rotation mechanism. The display device 41 and the optical plate 42 are rotated integrally around the rotation axis. The amount of rotation and the rotational direction are detected by using a position detection sensor (not illustrated). Depending on the rotational direction given to the aerial images 11 and 12, only the optical plate 42 may be rotated.

In the case where the aerial image 11 is formed by using the method in FIG. 3 or 4, the real object may be rotated. In the case where the aerial image 11 is formed by using the method in FIG. 5, the display device 45 may be rotated. In the case where the aerial image 11 is formed by using the method in FIG. 6, the infrared pulse laser 48 and the XYZ scanner 49 may be rotated integrally, or the coordinates given to the XYZ scanner 49 may be changed to the coordinates after rotation.

Third Reduction Example

A third example in which the overlapping reducing unit (see FIG. 8) reduces overlapping will be described by using FIGS. 29A to 30.

FIGS. 29A and 29B are diagrams illustrating an exemplary method of resolving a crossing between the aerial images 11 and 12. FIG. 29A illustrates the initial state. FIG. 29B illustrates an example of resolving a crossing through reduction in size.

Figure 30:
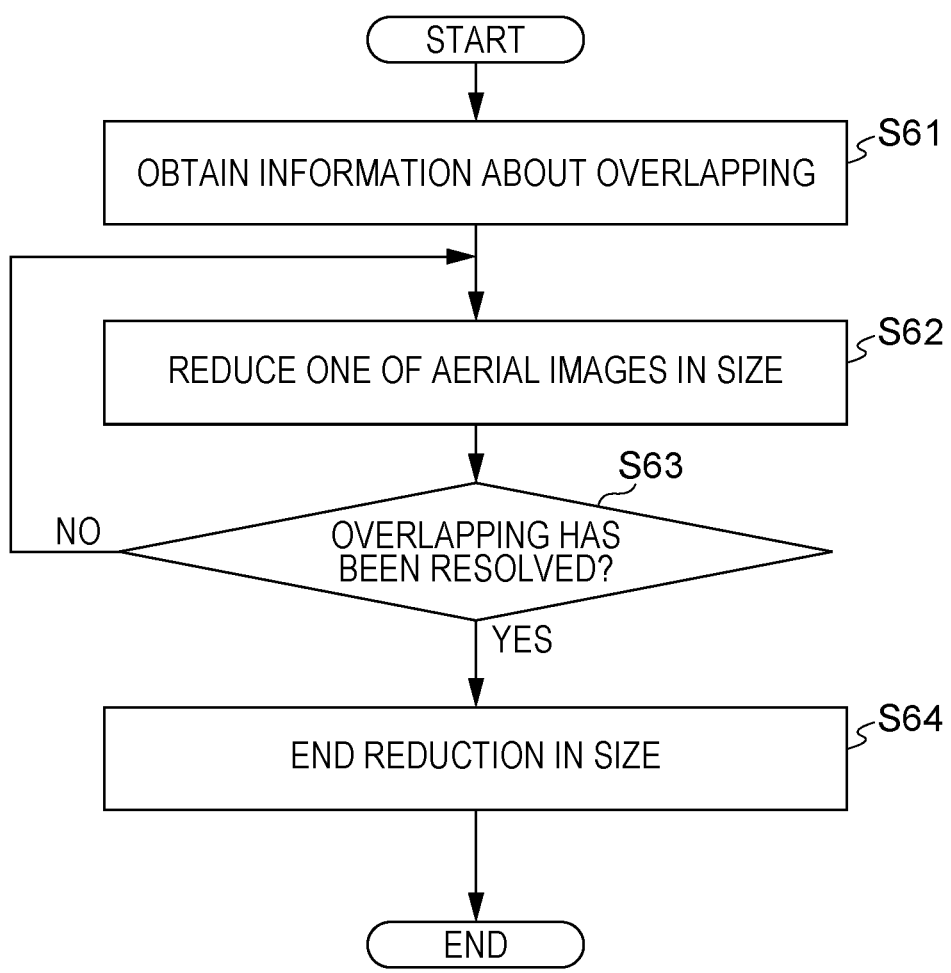
FIG. 30 is a diagram illustrating a process performed by an overlapping reducing unit.

FIG. 30 is a diagram illustrating a process performed by the overlapping reducing unit 61.

In the third reduction example, the aerial image 11 remains as it is, and the aerial image 12 is reduced in size, causing the overlapping to be resolved.

In the example in FIGS. 29A and 29B, the aerial image 12 is reduced in size by using the center of the image as a fixed point, causing the overlapping to be resolved.

The operations in the third reduction example are performed as follows. The overlapping reducing unit 61 (see FIG. 8) obtains, from the overlapping detection unit 60 (see FIG. 8), information about overlapping (step 61). The information about overlapping includes information about presence/absence of overlapping, the position of overlapping, and the positional relationship between the aerial images 11 and 12 in the space.

The overlapping reducing unit 61 reduces one of the aerial images (for example, the aerial image 12) in size so that the overlapping is resolved (step 62). In the first exemplary embodiment, the size is defined by using the length in the diagonal direction.

The overlapping reducing unit 61 determines whether or not the overlapping has been resolved through the reduction in size (step 63).

If the determination result is negative in step 63, the overlapping reducing unit 61 returns to step 62, and continuously reduces the image in size.

In contrast, if the determination result is positive in step 63 (if no overlapping occurs), the overlapping reducing unit 61 ends the reduction in size (step 64).

In FIG. 30, one of the aerial images 11 and 12 is reduced in size. Alternatively, both the images may be reduced in size.

Also in the case of FIG. 30, the image is continuously reduced in size until no overlapping between the aerial images 11 and 12 occurs. Alternatively, if the overlapping is reduced compared with the initial state, the control may be stopped before no overlapping occurs.

In the case where the aerial image 11 is formed by using the method in FIG. 2, the image displayed on the display device 41 may be reduced in size. In the case where the aerial image 11 is formed by using the method in FIG. 3 or 4, the object may be changed to a smaller object. In the case where the aerial image 11 is formed by using the method in FIG. 5, the image displayed on the display device 45 may be reduced in size. In the case where the aerial image 11 is formed by using the method in FIG. 6, a smaller range of coordinates for drawing may be given to the XYZ scanner 49.

Second Exemplary Embodiment

A second exemplary embodiment will be described below. In the first exemplary embodiment, overlapping between the aerial images 11 and 12 is detected. In the second exemplary embodiment, displacement of positions at which the aerial image forming apparatuses 31 and 32 and their components are mounted is detected.

Therefore, the schematic configuration of the aerial image forming system 1 (see FIG. 1) is common to that in the first exemplary embodiment. Accordingly, the aerial image forming system 1 according to the second exemplary embodiment also includes the aerial image forming apparatus (see FIG. 1) which forms the aerial image 11 (see FIG. 1), the aerial image forming apparatus 32 (see FIG. 1) which forms the aerial image 12 (see FIG. 1), and the overlapping detection apparatus 33 (see FIG. 1).

Figure 31:
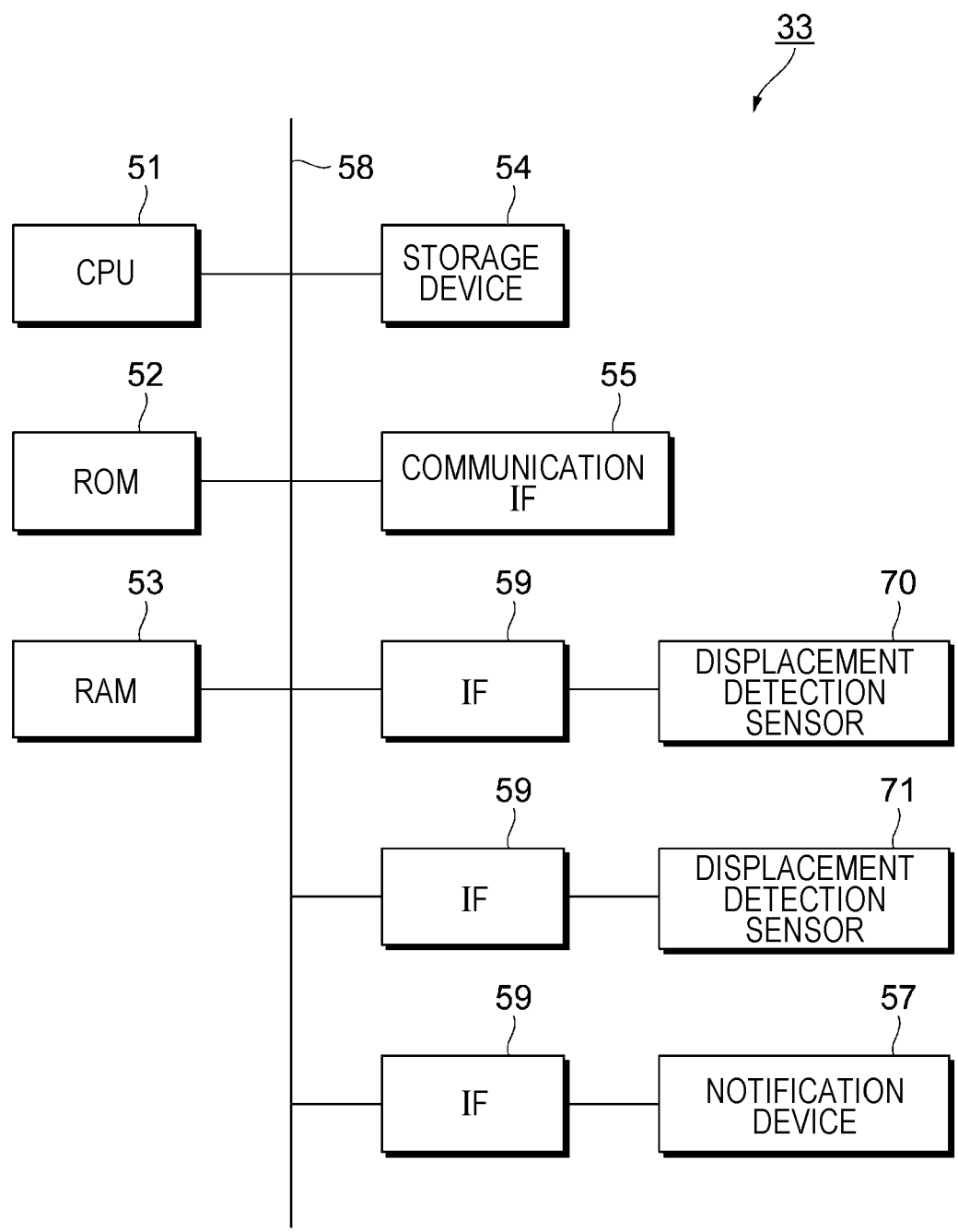
FIG. 31 is a diagram illustrating an exemplary hardware configuration of an overlapping detection apparatus according to a second embodiment.

FIG. 31 is a diagram illustrating an exemplary hardware configuration of the overlapping detection apparatus 33 according to the second exemplary embodiment.

In FIG. 31, the corresponding reference numerals are given to the components corresponding to those in FIG. 7.

In the overlapping detection apparatus 33 according to the second exemplary embodiment, instead of the overlapping detection sensor 56 (see FIG. 7), displacement detection sensors 70 and 71 are disposed. The displacement detection sensor 70 is provided on a base to which the aerial image forming apparatus 31 is attached, or is provided in the aerial image forming apparatus 31. The displacement detection sensor 71 is provided on a base to which the aerial image forming apparatus 32 is attached, or is provided in the aerial image forming apparatus 32.

Figure 32:
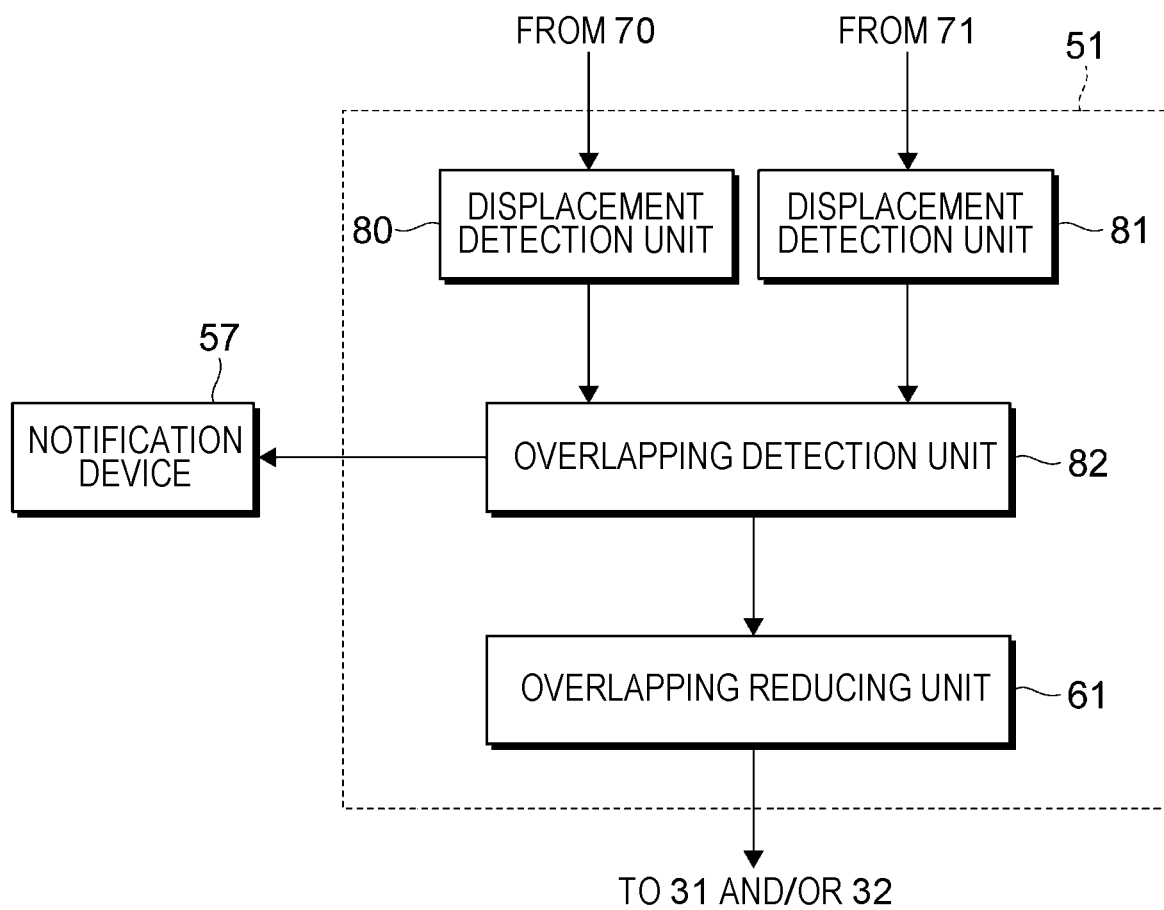
FIG. 32 is a diagram illustrating an exemplary functional configuration of the overlapping detection apparatus according to the second embodiment.

FIG. 32 is a diagram illustrating an exemplary functional configuration of the overlapping detection apparatus 33 (see FIG. 31) according to the second exemplary embodiment. In FIG. 32, the corresponding reference numerals are given to the components corresponding to those in FIG. 8.

The functional configuration in FIG. 32 is achieved through the CPU 51 executing programs.

The CPU 51 functions as a displacement detection unit 80, a displacement detection unit 81, an overlapping detection unit 82, and the overlapping reducing unit 61. The displacement detection unit 80 detects displacement of the mounting position of the aerial image forming apparatus (see FIG. 1) forming the aerial image 11 (see FIG. 1) and displacement of the mounting positions of components of the aerial image forming apparatus 31 (see FIG. 1) on the basis of an output signal from the displacement detection sensor 70. The displacement detection unit 81 detects displacement of the mounting position of the aerial image forming apparatus 32 (see FIG. 1) forming the aerial image 12 (see FIG. 1) and displacement of the mounting positions of components of the aerial image forming apparatus 32 (see FIG. 1) on the basis of an output signal from the displacement detection sensor 71. The overlapping detection unit 82 detects overlapping between the aerial images 11 and 12 on the basis of the detected displacement information. The overlapping reducing unit 61 controls one or both of the aerial image forming apparatuses 31 and 32 in accordance with the detected overlapping so that overlapping is reduced.

The overlapping detection unit 82 is an exemplary detection unit, and the overlapping reducing unit 61 is an exemplary reducing unit.

The displacement detection unit 80 obtains information about one or both of the following displacements: displacement of the mounting position of the aerial image forming apparatus 31; and displacement of the mounting positions of members, in the internal configuration of the aerial image forming apparatus 31, providing an effect on the position at which the aerial image 11 is formed.

The displacement detection unit 81 obtains information about one or both of the following displacements: displacement of the mounting position of the aerial image forming apparatus 32; and displacement of the mounting positions of members, in the internal configuration of the aerial image forming apparatus 32, providing an effect on the position at which the aerial image 12 is formed.

The overlapping detection unit 82 detects whether or not the coordinates of the space in which the aerial image 11 is formed overlap the coordinates of the space in which the aerial image 12 is formed, on the basis of the information about displacement which is provided from the displacement detection units 80 and 81. When overlapping is detected, the overlapping detection unit 82 notifies the notification device 57 and the overlapping reducing unit 61 of the detection of overlapping.

Figure 33:
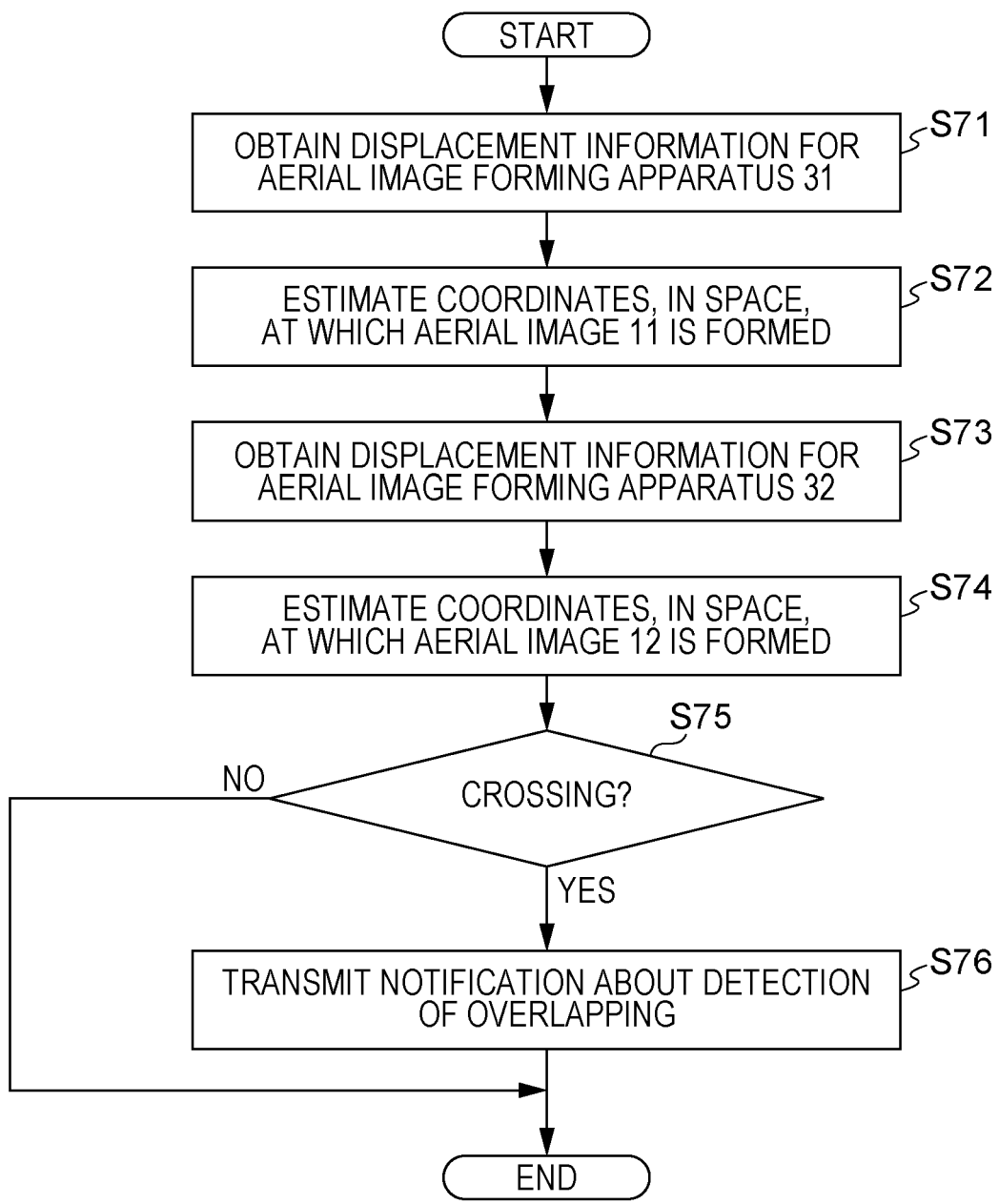
FIG. 33 is a diagram illustrating a process performed by an overlapping detection unit.

FIG. 33 is a diagram illustrating a process performed by the overlapping detection unit 82 (see FIG. 32).

The overlapping detection unit 82 obtains displacement information of the aerial image forming apparatus 31 from the displacement detection unit 80 (step 71). The displacement information includes information about a displacement of the entire apparatus, and information about displacement of components providing an effect on the position at which the aerial image 11 is formed.

The overlapping detection unit 82 estimates the coordinates, in the space, at which the aerial image 11 is formed, on the basis of the obtained displacement information (step 72).

FIGS. 34 to 37 illustrate exemplary displacements. FIGS. 34 to 37 are made on the premise of the apparatus configuration illustrated in FIG. 2. FIGS. 34 to 37 describe the aerial image forming apparatus 31 (see FIG. 1) which forms the aerial image 11.

Figure 34:
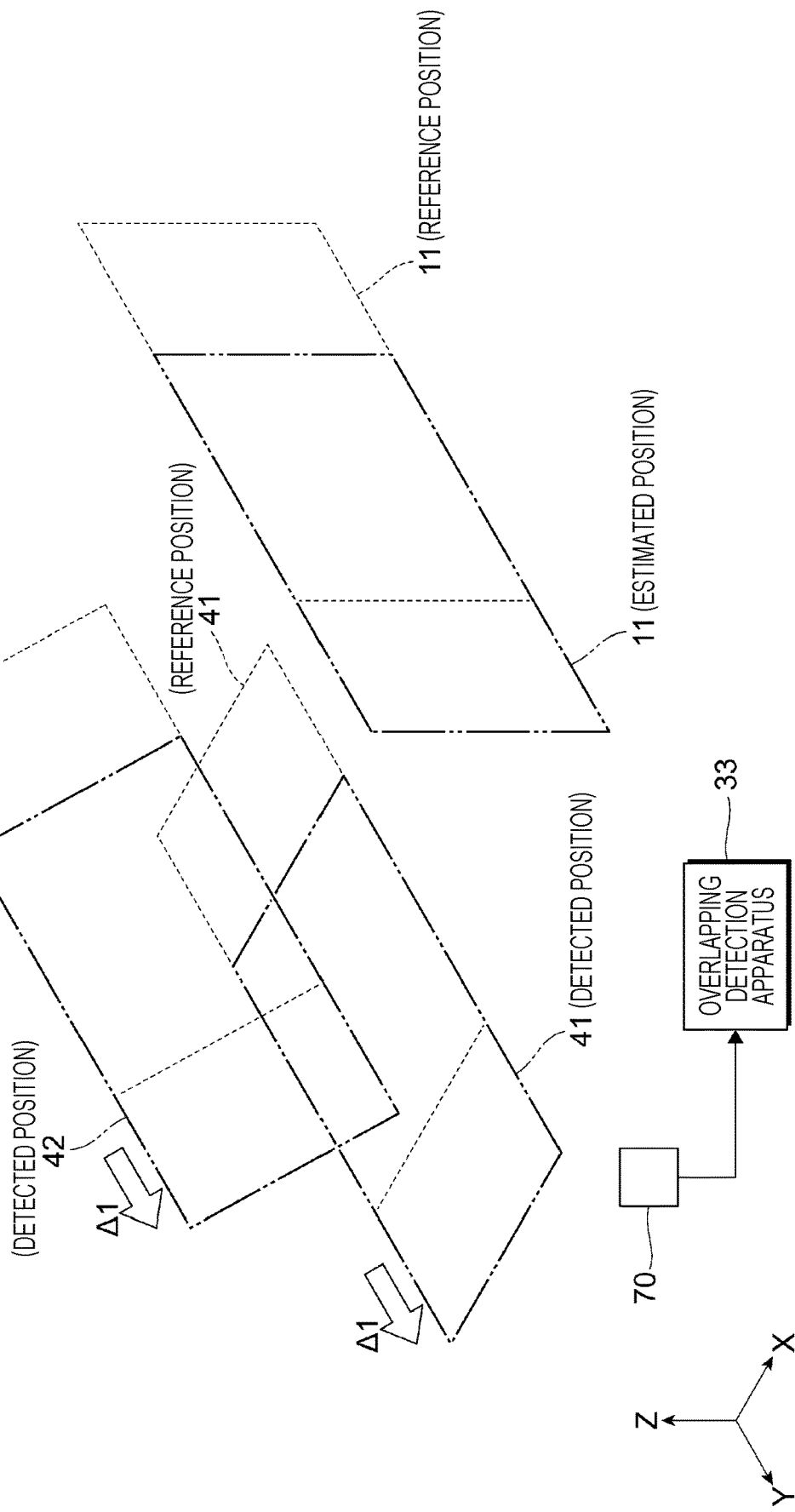
FIG. 34 is a diagram illustrating an example in which the entire apparatus is displaced in the Y-axis direction relative to the reference position.

FIG. 34 is a diagram illustrating an example in which the entire apparatus is displaced in the Y-axis direction relative to the reference position. Therefore, both of the display device 41 and the optical plate 42 are displaced in the Y-axis direction. The displacement detection sensor 70 outputs the displacement amount $\Delta 1$. When the entire apparatus is displaced in the Y-axis direction, the aerial image 11 formed in the air is also displaced in the Y-axis direction relative to the reference position.

The overlapping detection unit 82 estimates the position (coordinates) of the aerial image 11 in the space on the basis of the displacement amount $\Delta 1$.

The reference position is an exemplary initial state, and is also an exemplary design value. The initial state is provided, for example, in the state in which adjustment has been made. Therefore, the initial state does not necessarily match the design value. The displacement amount $\Delta 1$ is exemplary change information.

Figure 35:
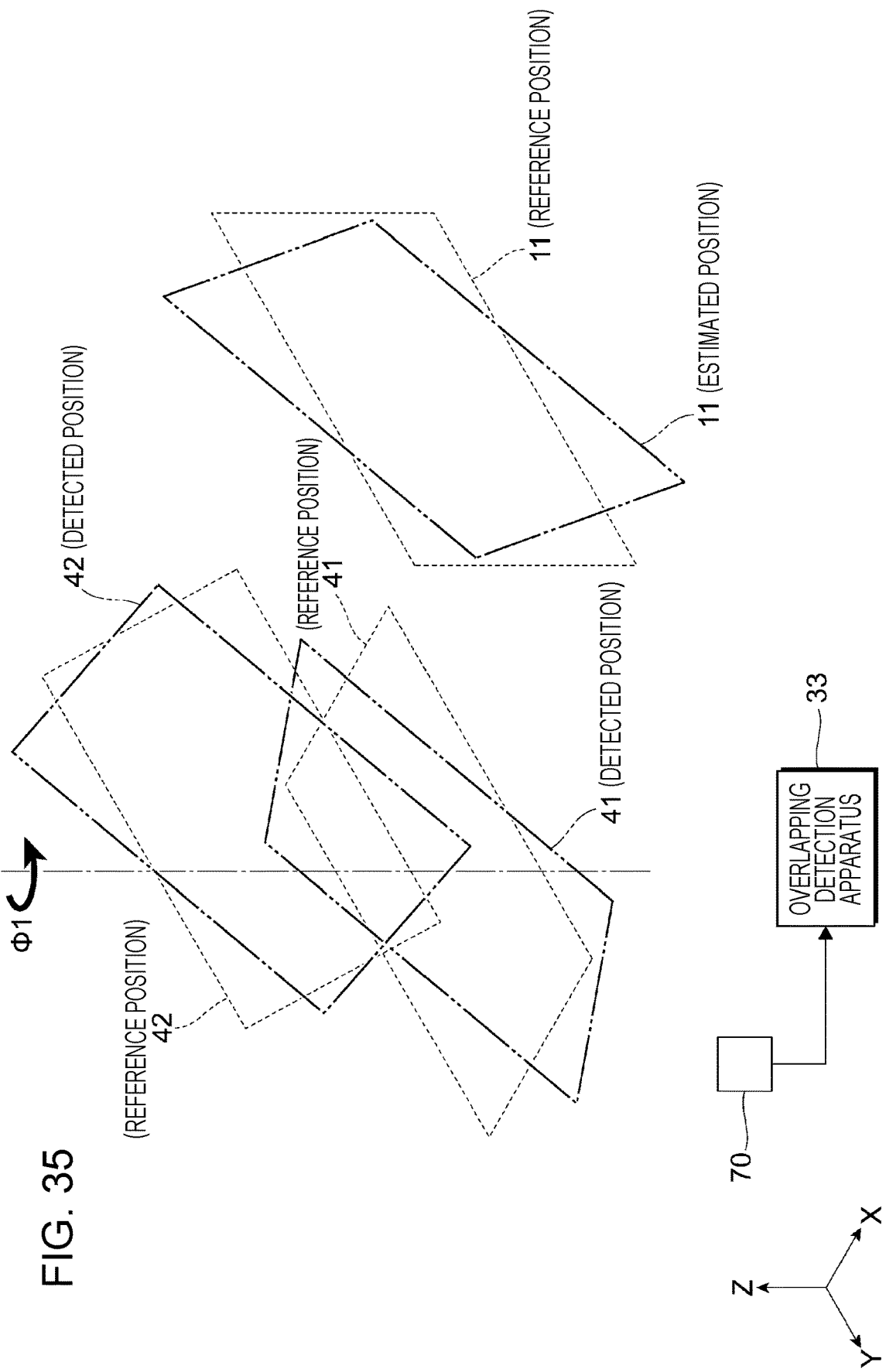
FIG. 35 is a diagram illustrating an example in which the entire apparatus is displaced in a rotational direction relative to the reference position.

FIG. 35 is a diagram illustrating an example in which the entire apparatus is displaced in a rotational direction relative to the reference position. In the example in FIG. 35, both of the display device 41 and the optical plate 42 are displaced counterclockwise around the Z axis. The displacement detection sensor 70 outputs the rotation amount $\phi 1$. When the entire apparatus is displaced around the Z axis, the aerial image 11 formed in the air is also displaced around the Z axis relative to the reference position. The overlapping detection unit 82 estimates the position (coordinates) of the aerial image 11 in the space on the basis of the rotation amount $\phi 1$. The reference position is an exemplary initial state, and is also an exemplary design value. The rotation amount $\phi 1$ is exemplary change information.

Figure 36:
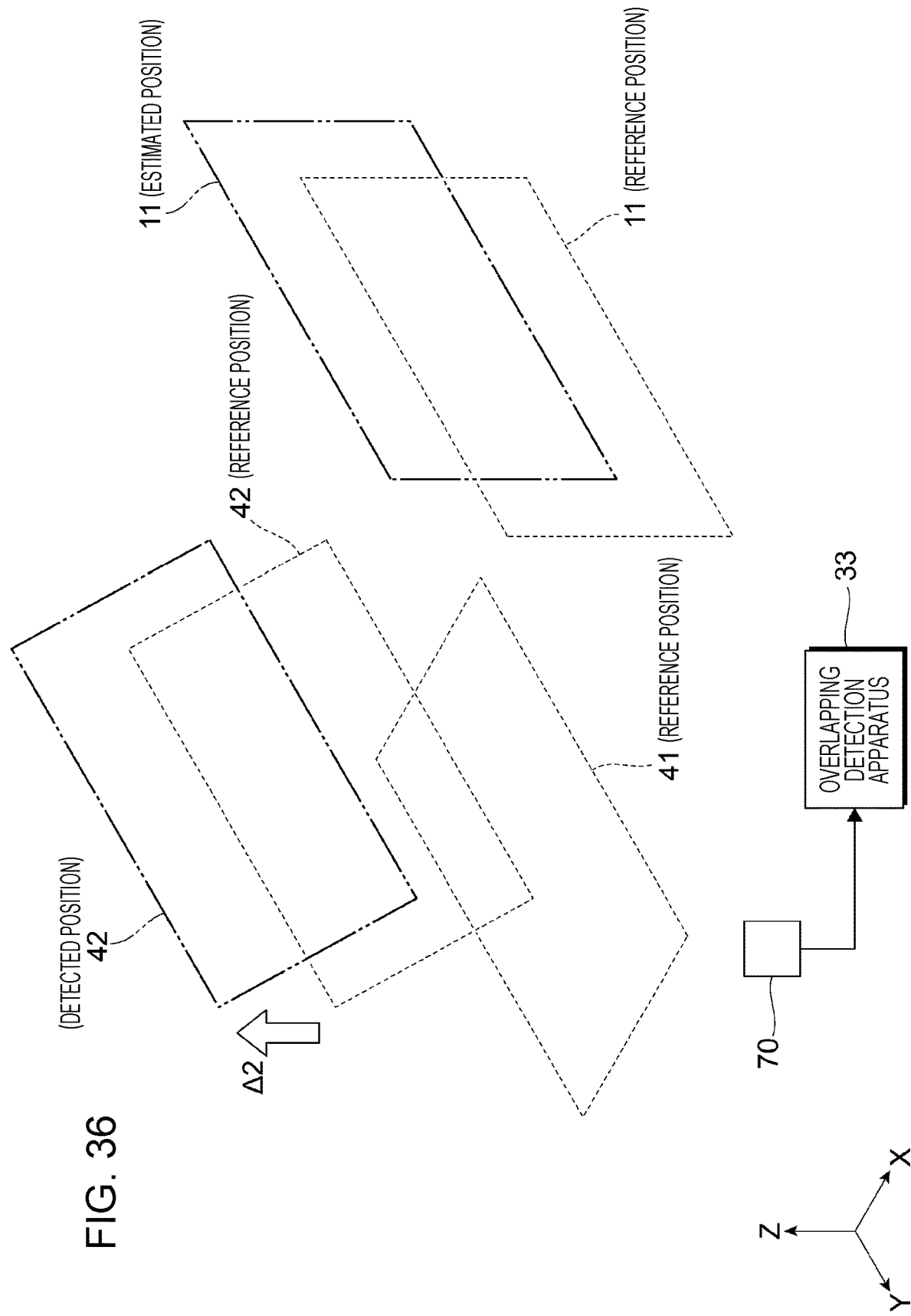
FIG. 36 is a diagram illustrating an example in which the optical plate included in an aerial image forming apparatus is displaced in the Z-axis direction relative to the reference position.

FIG. 36 is a diagram illustrating an example in which the optical plate 42 included in the aerial image forming apparatus 31 is displaced in the Z-axis direction relative to the reference position. The displacement detection sensor 70 outputs the displacement amount $\Delta 2$. When the optical plate 42 is displaced parallel to the Z axis, the aerial image 11 formed in the air is also displaced in the Z-axis direction and the X-axis direction relative to the reference position.

The overlapping detection unit 82 estimates the position (coordinates) of the aerial image 11 in the space on the basis of the displacement amount $\Delta 2$. The reference position is an exemplary position specified from the design value. The reference position is an exemplary mounting position. The displacement amount $\Delta 2$ is exemplary change information.

Figure 37:
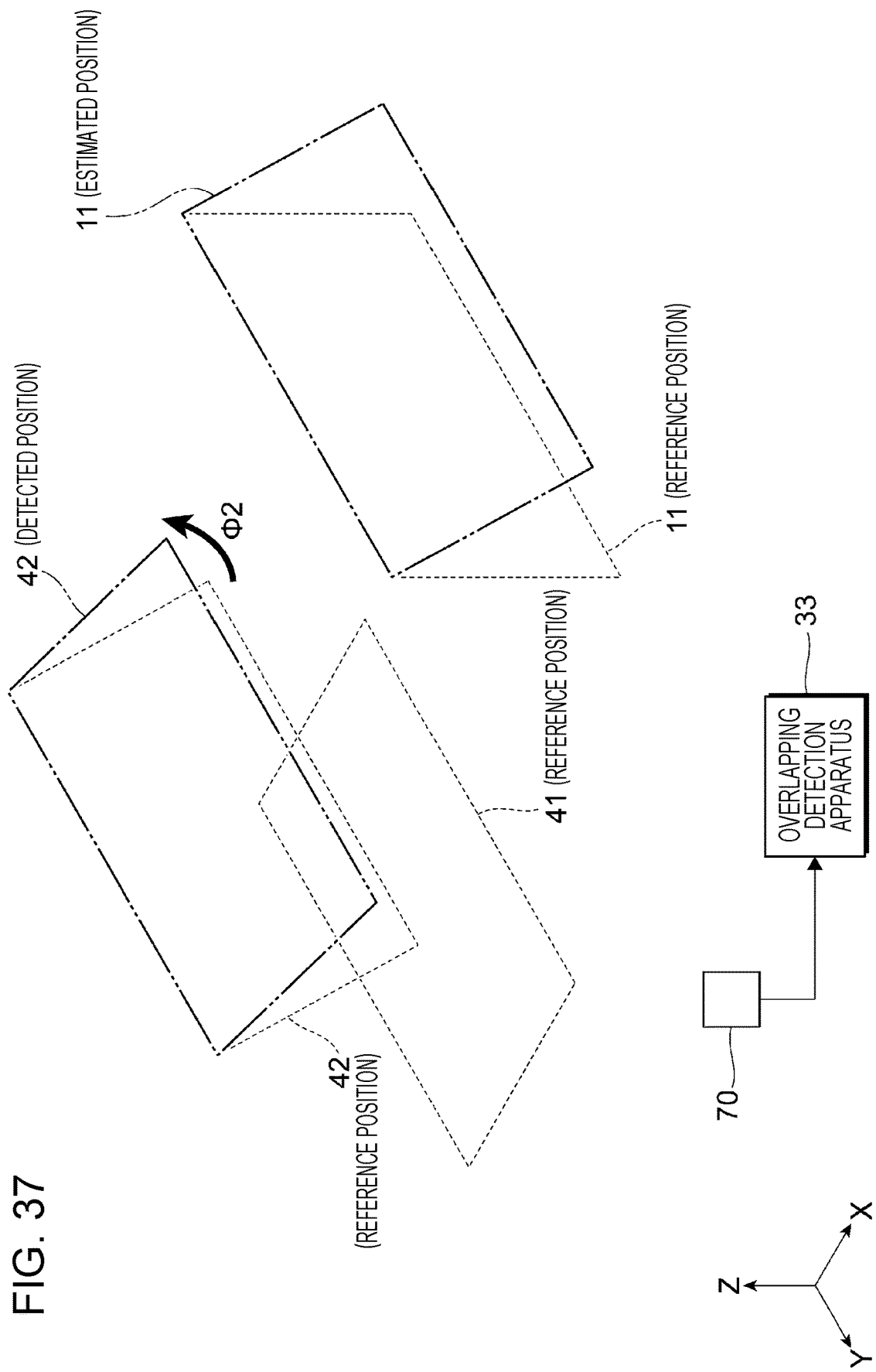
FIG. 37 is a diagram illustrating an example in which the optical plate included in an aerial image forming apparatus is displaced in a rotational direction relative to the reference position.

FIG. 37 is a diagram illustrating an example in which the optical plate 42 included in the aerial image forming apparatus 31 is displaced in a rotational direction relative to the reference position. In the example in FIG. 37, the optical plate 42 rotates counterclockwise around the Y axis. The displacement detection sensor 70 outputs the rotation amount $\phi 2$. When the optical plate 42 rotates around the Y axis, the aerial image 11 formed in the air is displaced so as to rotate relative to the reference position.

The overlapping detection unit 82 estimates the position (coordinates) of the aerial image 11 in the space on the basis of the rotation amount $\phi 2$. The reference position is an exemplary position specified from the design value. The reference position is an exemplary mounting position. The rotation amount $\phi 2$ is exemplary change information.

The description will return to FIG. 33.

The overlapping detection unit 82 obtains displacement information of the aerial image forming apparatus 32 (step 73), and estimates the coordinates, in the space, at which the aerial image 12 is formed, on the basis of the obtained displacement information (step 74).

When the positions at which the aerial images 11 and 12 are formed are estimated, the overlapping detection unit 82 determines whether or not the aerial image 11 crosses the aerial image 12 (step 75).

If the determination result is positive in step 75, the overlapping detection unit 82 transmits, through the notification device 57 (see FIG. 32), a notification about the detection of overlapping (step 76).

In contrast, if the determination result is negative in step 75, the overlapping detection unit 82 ends the process without notification. Alternatively, a notification that no overlapping occurs may be transmitted.

Other Embodiments

The exemplary embodiments of the present invention are described above. The technical scope of the present invention is not limited to the scope described in the above-described exemplary embodiments. It is clear, from the claims, that exemplary embodiments obtained by adding various changes or improvements to the above-described exemplary embodiments are included in the technical scope of the present invention.

In the exemplary embodiments described above, the case in which an aerial image 10 serving as an operation plane is planar is described. However, as in the description about the aerial image forming apparatus 31, the present invention may be applied to the case in which an aerial image 10 is formed three-dimensionally.

In the exemplary embodiments described above, overlapping between the aerial images 11 and 12 means simply a crossing. Alternatively, overlapping may include the state in which two images are viewed as if one image is overlain on the other, from the position from which it is assumed that the aerial images 11 and 12 are observed. For example, as illustrated in FIGS. 17A and 17B, overlapping may include, as one form, the positional relationship in which the aerial image 11 is located behind the aerial image 12. Also in this case, overlapping between images may be detected by applying the method illustrated in FIGS. 14A to 15.

In the exemplary embodiments described above, the case in which two aerial images 10 are formed in the air is described. However, the present invention may be applied to overlapping among three or more aerial images 10.

In the exemplary embodiments described above, an imaging camera is used as the overlapping detection sensor 56. The overlapping detection sensor 56 is not necessarily limited to an imaging camera as long as overlapping between the aerial images 11 and 12 may be detected.

What is claimed is:

1. An information processing apparatus comprising:
   an imaging camera configured to capture an image of a predetermined area; and
   a processor configured to analyze the image and detect undesirable overlapping of a first aerial image and a second aerial image within the image by detecting an intersection between the first aerial image and the second aerial image, wherein
   the first aerial image and the second aerial image are planar but not coplanar, and
   the intersection between the first aerial image and the second aerial image is when the image includes at least a portion of the first aerial image extending through the second aerial image or when the image includes at least a portion of the second aerial image extending through the first aerial image.

2. The information processing apparatus according to claim 1,
   wherein the image is captured in a state in which both of the first aerial image and the second aerial image are displayed, and the processor is configured to detect overlapping between the first aerial image and the second aerial image because a distance to a display plane in the image does not change monotonously in one direction in the image.

3. The information processing apparatus according to claim 1,
   wherein the processor is configured to detect overlapping between the first aerial image and the second aerial image when a near-far relationship between (a) a distance to a display plane in the image in which the first aerial image is displayed and (b) a distance to the display plane in the image in which the second aerial image is displayed is switched at a certain position in the image.

4. The information processing apparatus according to claim 1, wherein:
   the processor is configured to transmit a notification about the detection of overlapping.

5. The information processing apparatus according to claim 1, wherein:
   that the processor is configured to, when the overlapping is detected, control one or both of a first image forming unit and a second image forming unit in such a manner that the overlapping between the first aerial image and the second aerial image is reduced, the first image forming unit forming the first aerial image, the second image forming unit forming the second aerial image.

6. The information processing apparatus according to claim 5,
   wherein the processor is configured to change an angle, with respect to a floor, of a display plane of one or both of the first aerial image and the second aerial image.

7. The information processing apparatus according to claim 5,
   wherein the processor is configured to move one or both of the first aerial image and the second aerial image while an angle of a display plane thereof with respect to a floor is maintained.

8. The information processing apparatus according to claim 5,
   wherein the processor is configured to reduce one or both of the first aerial image and the second aerial image in display size.

9. The information processing apparatus according to claim 1,
   wherein the processor is configured to detect overlapping between the first aerial image and the second aerial image on a basis of change information, the change information including first change information and second change information, the first change information describing a change of a mounting position of a first image forming unit, the first image forming unit forming the first aerial image, the second change information describing a change of a mounting position of a second image forming unit, the second image forming unit forming the second aerial image.

10. The information processing apparatus according to claim 9,
    wherein the change information describes a direction of a change with respect to an initial state.

11. The information processing apparatus according to claim 9,
    wherein the change information describes a direction of a change with respect to a design value.

12. The information processing apparatus according to claim 1,
    wherein the processor is configured to detect overlapping between the first aerial image and the second aerial image on a basis of first change information and second change information, the first change information describing a change of a mounting position of an optical component included in a first image forming unit, the first image forming unit forming the first aerial image, the second change information describing a change of a mounting position of an optical component included in a second image forming unit, the second image forming unit forming the second aerial image.

13. An information processing system comprising:
    a first image forming unit that forms a first aerial image in the air;
    a second image forming unit that forms a second aerial image in the air; and
    a detection apparatus comprising
       an imaging camera configured to capture an image of a predetermined area, and
       a processor configured to analyze the image and detect undesirable overlapping of the first aerial image and the second aerial image within the image by detecting an intersection between the first aerial image and the second aerial image, wherein
       the first aerial image and the second aerial image are planar but not coplanar, and
       the intersection between the first aerial image and the second aerial image is when the image includes at least a portion of the first aerial image extending through the second aerial image or when the image includes at least a portion of the second aerial image extending through the first aerial image.

14. A non-transitory computer readable medium storing a program causing a computer to execute a process comprising:

analyzing an image of a predetermined area and detecting undesirable overlapping of a first aerial image and a second aerial image within the image by detecting an intersection between the first aerial image and the second aerial image, wherein the first aerial image and the second aerial image are planar but not coplanar, and the intersection between the first aerial image and the second aerial image is when the image includes at least a portion of the first aerial image extending through the second aerial image or when the image includes at least a portion of the second aerial image extending through the first aerial image.

* * * * *